(12) United States Patent
Fjeldheim et al.

(10) Patent No.: US 12,434,911 B2
(45) Date of Patent: Oct. 7, 2025

(54) METHOD, AND ASSOCIATED SYSTEM, OF PROVIDING AN OPERATOR ACCESS TO A TARGET STORAGE POSITION IN AN AUTOMATED STORAGE AND RETRIEVAL SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 805 days.

(21) Appl. No.: 17/634,376

(22) PCT Filed: Aug. 21, 2020

(86) PCT No.: PCT/EP2020/073453
§ 371 (c)(1),
(2) Date: Feb. 10, 2022

(87) PCT Pub. No.: WO2021/043597
PCT Pub. Date: Mar. 11, 2021

(65) Prior Publication Data
US 2022/0281684 A1    Sep. 8, 2022

(30) Foreign Application Priority Data
Sep. 2, 2019   (NO) .................................... 20191053

(51) Int. Cl.
*B65G 1/137*   (2006.01)
*A62C 3/00*    (2006.01)
(Continued)

(52) U.S. Cl.
CPC ............ *B65G 1/1373* (2013.01); *A62C 3/002* (2013.01); *B65G 1/0464* (2013.01); *G06Q 10/08* (2013.01);
(Continued)

(58) Field of Classification Search
CPC ................ B65G 1/1373; B65G 1/0464; B65G 2201/0235; B65G 2207/22;
(Continued)

(56) References Cited

U.S. PATENT DOCUMENTS

| 2012/0185080 | A1 | 7/2012 | Cyrulik et al. |
| 2015/0066283 | A1 | 3/2015 | Wurman et al. |
| 2019/0240517 | A1* | 8/2019 | Clarke ................. B65G 1/0464 |

FOREIGN PATENT DOCUMENTS

| CN | 108646762 A | 10/2018 |
| DE | 202014003113 U1 | 4/2014 |

(Continued)

OTHER PUBLICATIONS

International Search Report issued in PCT/EP2020/073453 on Nov. 13, 2020 (7 pages).
(Continued)

*Primary Examiner* — Jacob S. Scott
*Assistant Examiner* — Erin Morris
(74) *Attorney, Agent, or Firm* — Baker Botts L.L.P.

(57) ABSTRACT

An automated storage and retrieval system includes a rail system for guiding a plurality of container handling vehicles. The rail system includes a first set of parallel rails arranged in a horizontal plane and extending in a first direction, and a second set of parallel rails arranged in the horizontal plane and extending in a second direction, which is orthogonal to the first direction. The first and second sets of rails form a grid pattern in the horizontal plane including a plurality of adjacent grid cells. Each grid cell includes a (Continued)

grid opening defined by a pair of neighboring rails of the first set of rails and a pair of neighboring rails of the second set of rails. The automated storage and retrieval system includes a storage volume beneath the rail system. The storage volume includes storage columns for storing storage containers and the container handling vehicles are operable to retrieve a storage container from a stack of storage containers within the storage volume. A method of providing an operator access to a target storage position in the automated storage and retrieval system includes operating a master control system to allocate and instruct at least one container handling vehicle to remove storage containers along a first path between a position at a side edge or a top surface of the storage volume and the target storage position such that an operator can access the target storage position through the first path when the at least one container handling vehicle has removed the storage containers along the first path.

15 Claims, 16 Drawing Sheets

(51) Int. Cl.
*B65G 1/04* (2006.01)
*G06Q 10/08* (2024.01)

(52) U.S. Cl.
CPC .. *B65G 2201/0235* (2013.01); *B65G 2207/22* (2013.01); *B65G 2207/40* (2013.01)

(58) Field of Classification Search
CPC .. B65G 2207/40; B65G 1/1378; B65G 1/137; B65G 1/0492; A62C 3/002; A62C 27/00; A62C 2/00; A62C 37/00; A62C 99/00; A62C 99/009; G06Q 10/08
See application file for complete search history.

(56) References Cited

FOREIGN PATENT DOCUMENTS

| JP | 2009120380 A | 6/2009 | | |
|---|---|---|---|---|
| JP | 201480296 A | 5/2014 | | |
| NO | 317366 B1 | 10/2004 | | |
| NO | 346519 B1 | * | 9/2022 | ............... B65G 1/04 |
| WO | 2014/075937 A1 | 5/2014 | | |
| WO | 2014/090684 A1 | 6/2014 | | |
| WO | 2015/140216 A1 | 9/2015 | | |
| WO | 2015/193278 A1 | 12/2015 | | |
| WO | 2016/198467 A1 | 12/2016 | | |
| WO | WO-2017037095 A1 | * | 3/2017 | ........... B65G 1/0464 |
| WO | 2017/148963 A1 | 9/2017 | | |
| WO | 2019/068778 A1 | 4/2019 | | |
| WO | 2019/086237 A1 | 5/2019 | | |
| WO | 201981092 A1 | 5/2019 | | |
| WO | WO-2019081092 A1 | * | 5/2019 | ........... B65G 1/0414 |
| WO | WO-2021038437 A1 | * | 3/2021 | ........... B65G 1/0464 |
| WO | WO-2022090942 A1 | * | 5/2022 | ............. A62C 3/002 |
| WO | WO-2022109452 A2 | * | 5/2022 | ........... B65G 1/0414 |

OTHER PUBLICATIONS

Written Opinion of the International Searching Authority issued in PCT/EP2020/073453 on Nov. 13, 2020 (7 pages).

Norwegian Search Report issued in No. 20191053 mailed on Apr. 1, 2020 (2 pages).

Hirokazu Moribayashi, Notice of Reasons for Rejection for Japanese Patent Application No. JP2022513497, Jun. 7, 2024, 5 pages, Japanese Patent Office.

* cited by examiner

METHOD, AND ASSOCIATED SYSTEM, OF PROVIDING AN OPERATOR ACCESS TO A TARGET STORAGE POSITION IN AN AUTOMATED STORAGE AND RETRIEVAL SYSTEM

BACKGROUND OF THE INVENTION

FIGS. 1A and 1C disclose a typical prior art automated storage and retrieval system 1 with a framework structure 100. FIGS. 1B and 1D disclose prior art container handling vehicles 200,300 operating on the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107.

Each storage container 106 may typically hold a plurality of product items (not shown), and the product items within a storage container 106 may be identical, or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage grid 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 respectively due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 200,300 so that the position of the gripping/engaging devices with respect to the vehicle 200,300 can be adjusted in a third direction Z which is orthogonal the first direction X and the second direction Y.

Conventionally, and also for the purpose of this application, Z=1 identifies the uppermost layer of the storage grid 104, i.e. the layer immediately below the rail system 108, Z=2 the second layer below the rail system 108, Z=3 the third layer etc. In the exemplary prior art storage grid 104 disclosed in FIGS. 1A and 1C, Z=8 identifies the lowermost, bottom layer of the storage grid 104. Consequently, as an example, and using the Cartesian coordinate system X, Y, Z indicated in FIGS. 1A and 1D, the storage container identified as 106' in FIG. 1A can be said to occupy grid location or cell X=10, Y=2, Z=3. The container handling vehicles 101 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a container receiving space arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column, e.g. as is disclosed in WO2014/090684A1.

The rail system 108 may be a single rail (also denoted single track) system, as is shown in FIG. 2A. Alternatively, the rail system 108 may be a double rail (also denoted double track) system, as is shown in FIG. 2B, thus allowing a container handling vehicle 200 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111.

In FIG. 2B the grid cell 122 is indicated by a dashed box. For example, the sections of the rail-based system being made of aluminium are the rails, and on the upper surface of the rails, there are a pair of tracks that the wheels of the vehicle run in. However, the sections could be separate rails each with a track.

Consequently, rails 110a and 110b form pairs of rails defining parallel rows of grid cells running in the X direction, and rails 111a and 111b form pairs of rails defining parallel rows of grid cells running in the Y direction. Similarly, on a delivery rail system 50, rails 51a and 51b form pairs of rails defining parallel rows of grid cells running in the X direction, and rails 52a and 52b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space therebetween.

In a storage grid 104, a majority of the grid columns are storage columns 105, i.e. grid columns 105 where storage containers 106 are stored in stacks 107. However, a storage grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the storage grid 104 or transferred out of or into the storage grid 104. Within the art, such a location is normally referred to as a "port" and the grid column in which the port is located may be referred to as "port column" or "delivery column" 119,120. The drop-off and pick-up ports of the rail system 108 where the container handling vehicles 200,300 operate are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 from an access or a transfer station. Each of the ports of the first and second delivery column may comprise a port suitable for both pick up and drop of storage containers.

The second location may typically be a picking or a stocking station where product product items are removed from or positioned into the storage containers 106. In a picking or a stocking station, the storage containers 106 are normally never removed from the automated storage and retrieval system 1, but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

A conveyor system comprising conveyors may be employed to transport the storage containers between the lower port of the delivery column and the access station.

If the lower port of the delivery column and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between delivery columns and work stations where operators can access the storage containers.

When a storage container 106 stored in the storage grid 104 disclosed in FIG. 1A is to be accessed, one of the container handling vehicles 200,300 is instructed to retrieve the target storage container 106 from its position in the storage grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device 16, and transporting the storage container 106 to the delivery column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the storage grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105, or relocated to other storage columns 105.

It is a problem with the prior art systems that fire-fighting crew, after a sprinkler system apparently has extinguished a fire in the grid, cannot gain sufficient access to the grid to verify that the fire actually has been extinguished.

One objective of the present invention is thus to provide a solution which provides the firefighting crew with a possibility of visual inspection of a target storage position within an automated storage and retrieval system In general, an objective of the invention is to provide a method of providing manual (i.e. operator) access to positions within the grid.

SUMMARY OF THE INVENTION

The invention is set forth in the independent claims and the dependent claims describe alternatives of the invention.

It is described a method of providing an operator access to a target storage position in an automated storage and retrieval system, the automated storage and retrieval system comprising:

a rail system for guiding a plurality of container handling vehicles, the rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells, each grid cell comprising a grid opening defined by a pair of neighboring rails of the first set of rails and a pair of neighboring rails of the second set of rails; the automated storage and retrieval system further comprising a storage volume beneath the rail system, wherein the storage volume comprises storage columns for storing storage containers and the container handling vehicles are operable to retrieve a storage container from a stack of storage containers within the storage volume, wherein the method comprises the steps of:

operating a master control system to allocate and instruct at least one container handling vehicle to remove storage containers along a first path between a position at a side edge or a top surface of the storage volume and the target storage position such that an operator can access the target storage position through the first path when the at least one container handling vehicle has removed the storage containers along the first path.

The method thus comprises a step that the container handling vehicles follow the instructions from the master control system and remove the storage containers to make the first path.

The first path is made once all of the storage containers in all storage columns between the position at the side edge or the top surface of the storage volume and the target storage position have been removed by the container handling vehicles.

The master control system keeps track of any remotely operated vehicles operating on the rail system.

Access to a specific target storage position can be desirable to provide visual inspection after a fire has occurred, in order to repair the grid, loosen or free-up unliftable storage containers within the grid etc. Access can be from above the rail system (i.e. from a top surface of the storage volume) and down into the storage column where the target storage position is, or a neighbor storage column to the storage column where the target storage position.

The storage containers are removed or cleared by the container handling vehicle(s) in order to provide the at least first path, and may be moved to any available position within the automated storage and retrieval system or a position outside the automated storage and retrieval system. The available position may be an empty storage position within the storage volume or a position at a port. In the first case the removed storage containers may be spread to vacant storage positions in storage columns anywhere within the grid. An area may be set aside to receive such removed storage containers, and the area may be enclosed within a fire barrier. An advantage of moving said storage containers to port, is that visual inspection of the storage container may be performed as well as any damage or smoke damage to item(s) stored in the storage container may be identified. Alternatively, dedicated areas of the storage system may have free capacity to receive a large amount of the removed storage containers.

The method may further comprise, prior to the master control system allocating and instructing at least one container handling vehicle to remove storage containers along the first path, a step of:

determining a target storage position. The target storage position may be a storage column, a set of storage columns, or may be one or more specific levels within a storage column or set of storage columns.

The first path may be a loop path enclosing the target storage position and the master control system may instruct the at least one container handling vehicle (preferably a plurality of container handling vehicles to reduce time) to remove storage containers along the loop path. In case of fire, it is necessary to be able to get a 360 degrees inspection of the scene of fire, therefore the loop path preferably extends 360 degrees around the scene of fire. However, if visual inspection may be obtained from outside of the storage volume, it may be sufficient to remove storage containers from a path in the storage volume provided that 360 degrees inspection is obtained.

Alternatively, in some situations it may not be necessary to remove all storage containers such that a 360 degrees inspection is achieved. In these situations, a path which extends substantially around the target position but have a section where storage containers are not removed or are only partially removed from a given stack may also be made (e.g. allowing an observer to peer around but not allowing that person to walk around easily without climbing over the remaining storage containers).

The method may comprise collecting and evaluating information with regards to location of a scene of fire, fume, heat or smoke in the automated storage and retrieval system, where the collecting of information comprises steps of:

operating a plurality of remotely operated vehicles on the rail system, each of the remotely operated vehicles being provided with a detection device for detecting fire, heat, fume or smoke, and wherein the detection devices are configured to transmit data from the detection devices to the master control system via communication means in the container handling vehicle carrying the detection device that has collected information; and utilizing the master control system to process any data from any of the detection devices and using the master control system to provide information of location of the scene of fire, fume, heat or smoke; and, utilizing the master control system to determine where to remove storage containers to create the first path.

The method may further comprise, in case any of the remotely operated vehicles indicates presence of fire, heat, smoke- or fume emission, the method further comprises, the steps of:

allocating another remotely operated vehicle with a detection device for detecting fire, heat, fume or smoke to move to a cell nearby the position of the remotely operated vehicles indicating presence of fire, heat, smoke- or fume emission; and utilizing the master control system to process the data from the detection devices from the remotely operated vehicles, wherein the master control system, based on the processing of the information from the detection devices, decides whether a reasonable prediction on location of source of the fire, fume, smoke- or heat emission can be given.

The method may further comprise, if the master control system has decided that a reasonable prediction on location of source of the fire, fume, smoke- or heat emission can be given, the step of:

utilizing the master control system to determine the position of the source of the fire, fume, smoke or heat emission in the form of a triangular arrangement by comparing information from at least three detection devices.

The method may further comprise, if the master control system has decided that a reasonable prediction on location of source of the fire, fume, smoke- or heat emission can be given, the step of:

utilizing the master control system to determine the position of the source of the fire, fume, smoke or heat emission in the form of a four-cornered polygon arrangement by comparing information from at least four detection devices.

In order to provide a better decision basis in relation to where to clear a passage or path of storage containers if involved in fire-preventing operations, the decision on where to remove storage containers from is a trade-off between removing containers close enough to get a good visual indication of any remaining smoke or heat emission near the target storage position and at a sufficient distance such that it is actually possible to remove the storage containers. To be able to remove or clear storage containers they need to be more or less un-damaged, at least in the connection points for the grippers. If these points are in anyway damaged, e.g. melted or misaligned due to stability issues in underlying storage containers or in the framework of the grid, the grippers on the lifting frame of the container handling vehicles experiences problems when gripping and subsequently lifting and moving the storage container. As such, damaged containers, such as those located close to the location of a fire cannot be remove from the storage grid easily by the container handling vehicles.

The container handling vehicles may comprise a plurality of detection devices for detecting fire, fume smoke, or heat. All of the container handling vehicles operates on the rail system, and can be provided with one or more detection devices. The fire, fume, smoke or heat detection devices are configured to transmit data from the detection device to a master control system directly or, alternatively, via communication means present in the container handling vehicle carrying the specific detection device.

The master control system may comprise a processing device for processing the data from the detection devices such as to create a heat map of the automated storage and retrieval system. The master control system keeps track of any remotely operated vehicles operating on the rail system and is configured to receive data from any of the detection device(s). This may provide valuable input in assisting in where to make a passage with regards to the location and extent of the probable scene of fire, fume, heat or smoke, in particular as the automated storage and retrieval systems increase in size (up to 110×150 meters and above, and with 500000 bins and more). For example, the master control system may be configured to generate a temperature map or heat map based on the data. As the warehouses where the automated storage and retrieval systems are installed are often dark due to limited requirement of light sources in the warehouse during normal operation, and any external power sources providing light sources with electric power may shut-off in the event of fire, such a temperature map or "heat map" can give valuable information in at least X and Y direction (in a horizontal plane) on where the scene of the fire, fume, heat or smoke is most likely to be located, and also information on the extent of the scene of fire, fume, heat or smoke in the X and Y directions.

The method may further comprise the step of:

operating a master control system to allocate and instruct at least one container handling vehicle to remove storage containers along a second path between a position at an edge of the storage volume and the target storage position and/or the first path. The loop of the first path could be one or two storage container distances away from the source of the fire, fume, heat or smoke and the target storage position. Alternatively or additionally, the loop of the first path can be close to the target storage position such that an operator can access the target storage position through any of the first and/or second paths.

The method thus comprises a step that the container handling vehicles follow the instructions from the master control system and remove the storage containers to make the second path.

The method may further comprise a step of updating of the target storage position to include one or more additional column(s). For example, if a storage container outside of the initial target storage position has become damaged then it is likely that the fire has reached further than initially thought. The second path may be created from a different side edge of the storage volume than the first path, or the second path is created from the same side edge of the storage volume as the first path.

The method may further comprise a step of:

utilizing the master control system to determine where to move the storage containers from the path(s), and, based on where available positions are located, a step of:

instructing the container handling vehicle(s) to move the storage containers to one of the available position(s). The method may therefore comprise the step of moving the storage containers determined to be in the first and/or second path.

The available position may be an empty storage position or a position at a port.

The method may provide access to an unliftable storage container within a storage column, and the step of determining the target storage position may comprise the steps of:
- receiving information from a container handling vehicle indicating that a storage container at the target storage position is unliftable;
- utilizing the master control system to remove storage containers along the first path between the position at the edge of the storage volume and the target storage position where the unliftable storage container is located such that an operator can access the unliftable storage container. If a storage container is found to be unliftable, it will be the top of the stack at that point because that is the one the lifting frame of the container handling vehicle is trying to engage with. In such situations, the container handling vehicle will be able to provide such information because, as the master control system known the position of all storage containers, the position of the unliftable storage container is known. In this embodiment, an operator can manually remove or loosening said container after creating the walk path to the target storage position where the unliftable storage container is located.

It is further described an automated storage and retrieval system, the automated storage and retrieval system comprising:
- a rail system for guiding a plurality of container handling vehicles, the rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells, each grid cell comprising a grid opening defined by a pair of neighboring rails of the first set of rails and a pair of neighboring rails of the second set of rails;
- a storage volume beneath the rail system, wherein the storage volume comprises storage columns for storing storage containers and the container handling vehicles are operable to retrieve a storage container from a stack of storage containers within the storage volume;
- at least one container handling vehicle operable on the rail system, the container handling vehicle comprising a lifting assembly for picking up storage containers from the storage columns to a position above the lowest level of the transport mechanism, and the lifting assembly comprises a lifting frame connectable to a storage container, the lifting frame being configured to lift and lower the storage containers from a position in the storage column to a position above the rail system;
- a master control system configured to allocate and instruct at least one of the container handling vehicle to remove storage containers along a first path between a position at a side edge or a top surface of the storage volume and a target storage position within the storage volume, such that an operator can access the target storage position through the first path when the at least one container handling vehicle has removed the storage containers along the first path.

The target storage position may be determined based on required access to a target storage position in need of inspection, maintenance or repair.

The remotely operated vehicles may be container handling vehicles comprising a lifting assembly for picking up storage containers from the storage columns to a position above the lowest level of the transport mechanism, and the lifting assembly may comprise a lifting frame connectable to a storage container, the lifting frame being configured to lift and lower the storage containers from a position in the storage column to a position above the rail system.

BRIEF DESCRIPTION OF THE DRAWINGS

The following drawings depict exemplary embodiments of the present invention and are appended to facilitate the understanding of the invention. However, the features disclosed in the drawings are for illustrative purposes only and shall not be interpreted in a limiting sense.

FIG. 1A and FIG. 1C show the complete system and FIG. 1B and FIG. 1D show examples of a system operable prior art container handling vehicles;

FIG. 2A shows a single rail system, FIG. 2B shows a double rail system and FIG. 2C shows a double rail system with the width and length of a container handling vehicle grid cell indicated;

DETAILED DESCRIPTION OF THE INVENTION

Figure 1A:
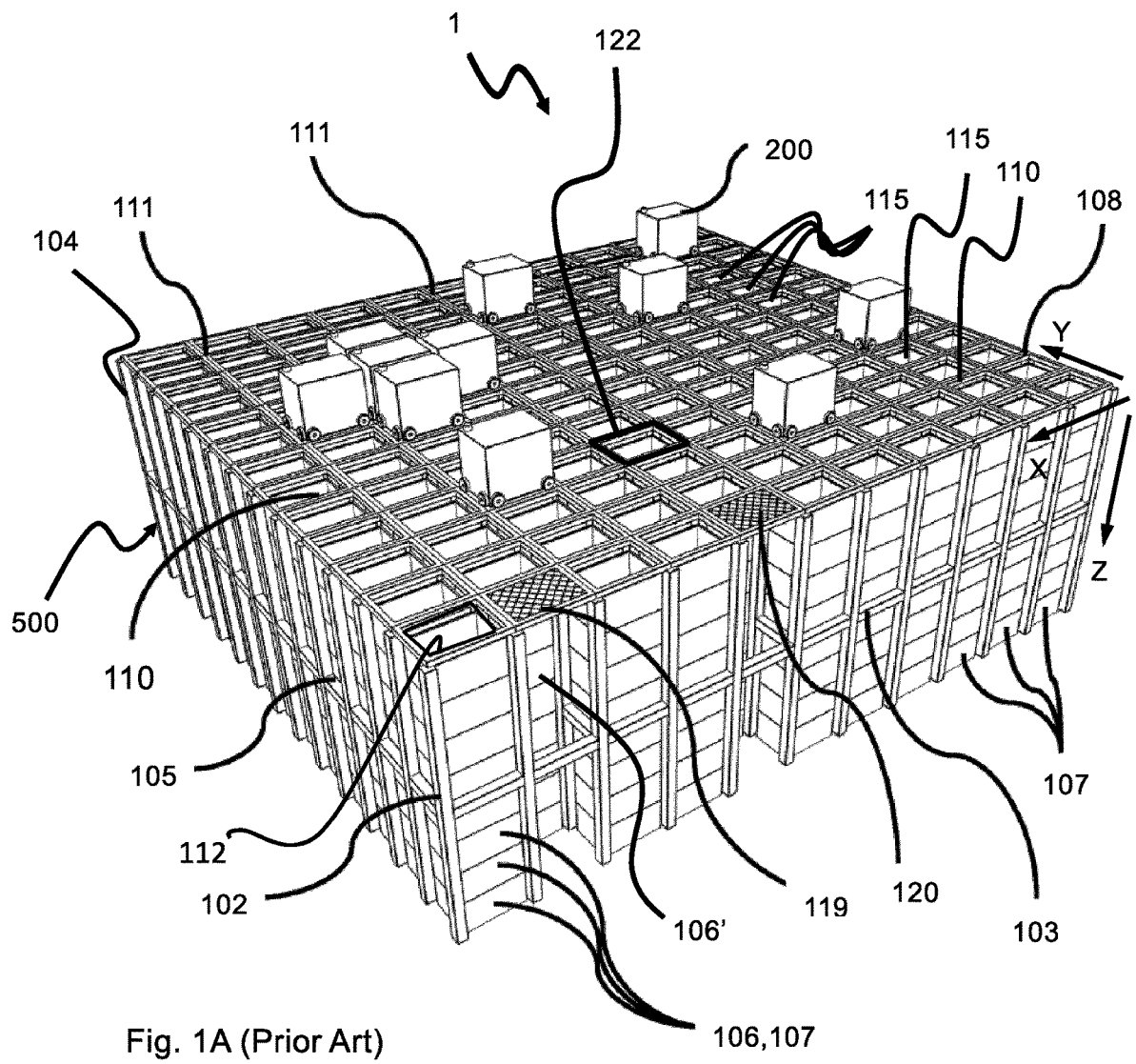
FIG. 1A-D are perspective views of a prior art automated storage and retrieval system, where
Figure 1B:
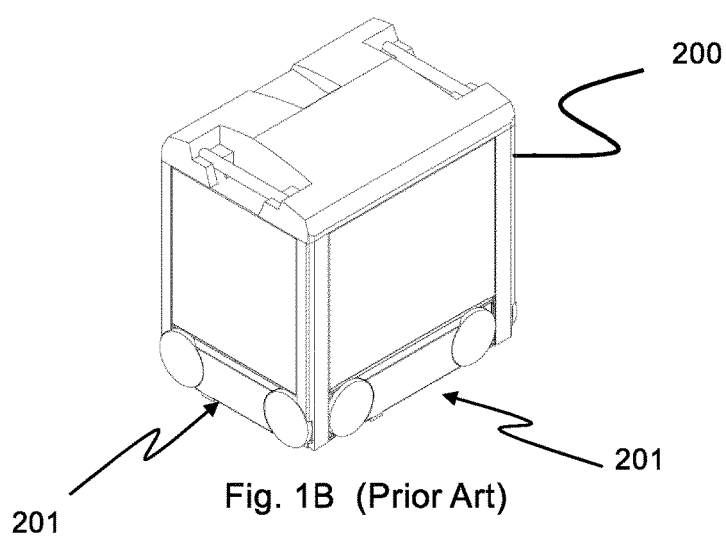

In the following, different alternatives will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the related methods as well, and vice versa.

With reference to FIGS. 1A-D the storage grid 104 of each storage structure 1 constitutes a framework 100 of in total 143 grid columns 112 (see grid column 112 in top front corner, i.e. grid location or cell X=11, Y=1, Z=0), where the width and length of the framework corresponds to the width and length of 13 and 11 grid columns 112, respectively. The top layer of the framework 100 is a container handling vehicle rail system/rail system 108 on which a plurality of container handling vehicles 200,300 are operated.

Figure 1C:
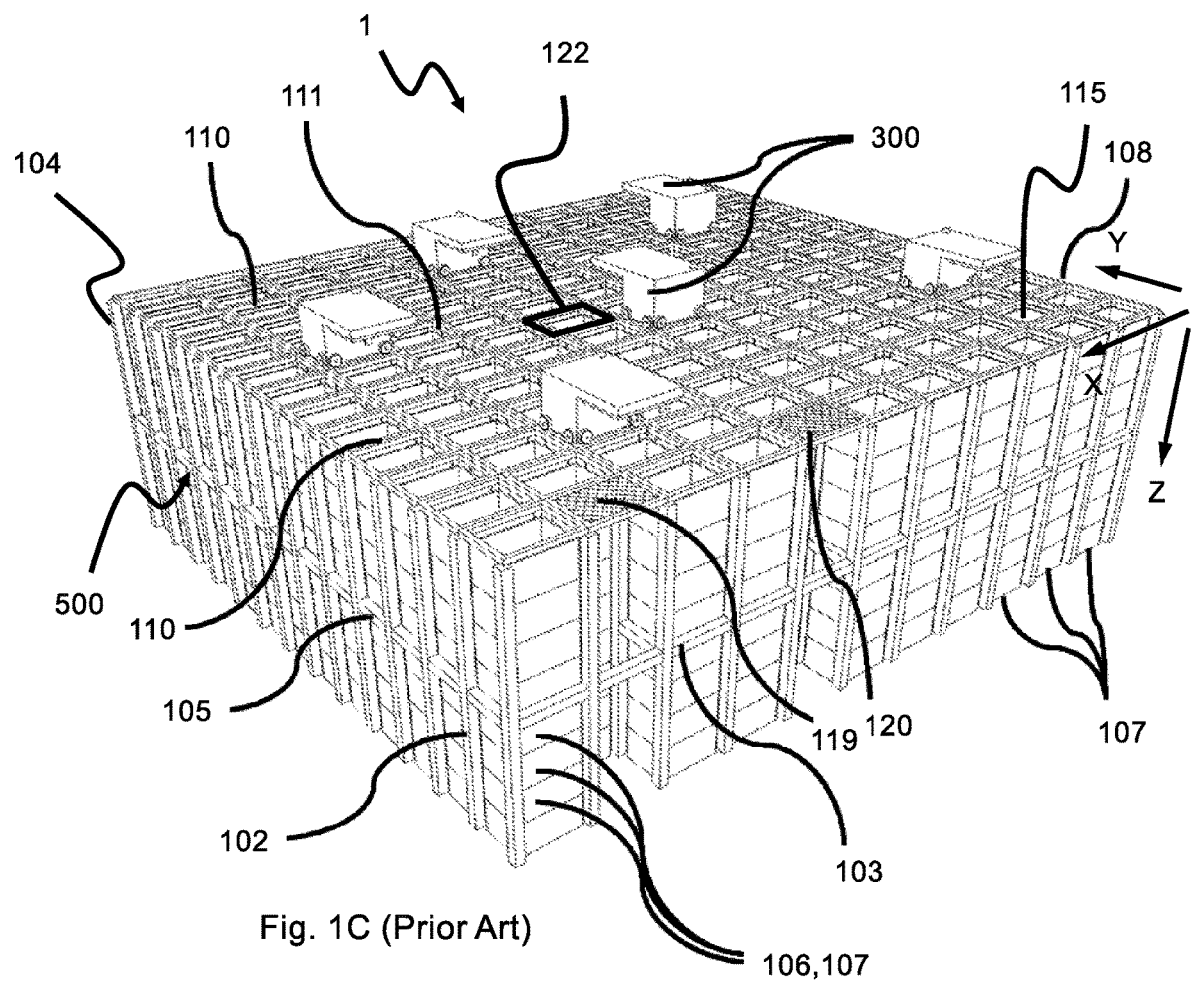
Figure 1D:
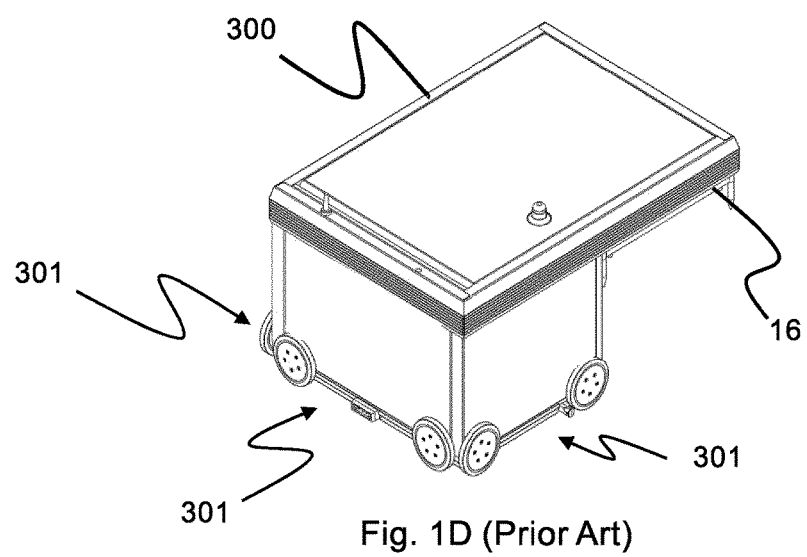

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes a container handling vehicle rail system 108 of parallel rails 110,111 in the X direction and the Y direction, respectively, arranged across the top of storage columns 105. The horizontal area of a single grid opening 115, i.e. along the X and Y directions, may be defined by the distance between adjacent rails 110 and 111, respectively (see also FIGS. 2A-2C). In FIGS. 1A and 1C, a grid cell 122 is marked on the rail system 108 by thick lines. The area between adjacent rails is the grid opening 115—the grid cell 122 is the area to the outer side edges of the opposing rails running along the opposite sides of the grid opening. Alternatively, if these are defined in terms of double-tracked rails, then the area is to the midpoint or centre of each adjacent rail.

The container handling vehicle rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the storage grid 104 may have a horizontal extent of more than 700×700 grid cells 122, or any size in between these examples, e.g. 100×100 grid cells, 200×200 grid cells, 500×500 grid cells etc. Also, the grid 104 can be considerably deeper than disclosed in FIGS. 1A and 1C. For example, the storage grid 104 may be more than twelve grid cells deep.

The storage grid 104 is equal or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119,120 configured to receive a storage container 106 from a container handling vehicle 200,300.

The rail system 108 comprises a first set of parallel trails 110 arranged in a horizontal plane (P) and extending in a first direction (X) and a second set of parallel rails 111 arranged in the horizontal plane (P) and extending in a second direction (Y) which is orthogonal to the first direction (X). The first and second sets of rails 110, 111 form a grid pattern in the horizontal plane (P) comprising a plurality of adjacent grid cells 122. Each grid cell 122 displays a grid opening defined by a pair of neighbouring rails of the first set of rails 110 and a pair of neighbouring rails of the second set of rails 111.

The plurality of stacks 107 are arranged in storage columns 105 located beneath the rail system 108, wherein each storage column 105 is located vertically below a grid cell 122.

Each container handling vehicle 200,300 is configured to move on the rail system 108 above the storage columns 105.

The storage container vehicles 200,300 may be of any type known in the art, e.g. any one of the automated container handling vehicles disclosed in WO2014/090684 A1, in NO317366 or in WO2015/193278A1.

Figure 2A:
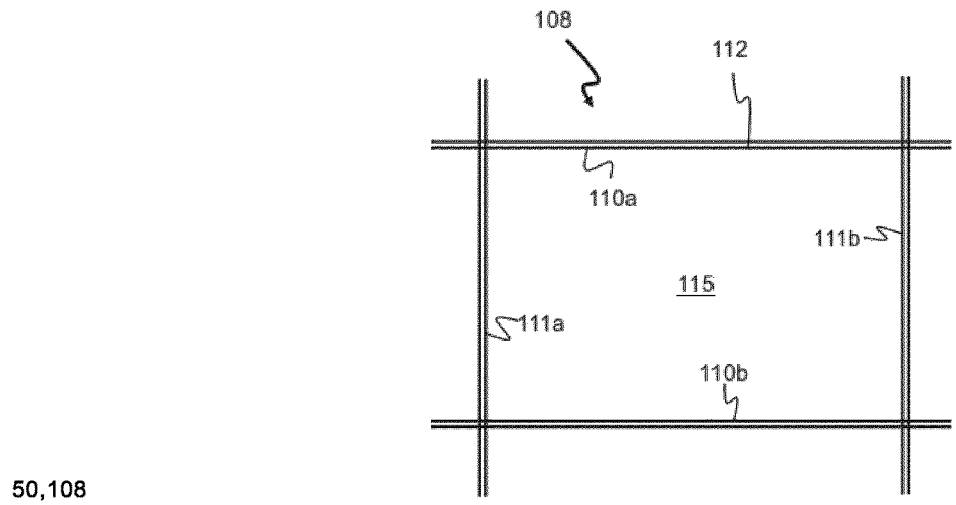
FIGS. 2A-C is a top view of a container handling vehicle rail system, where
Figure 2B:
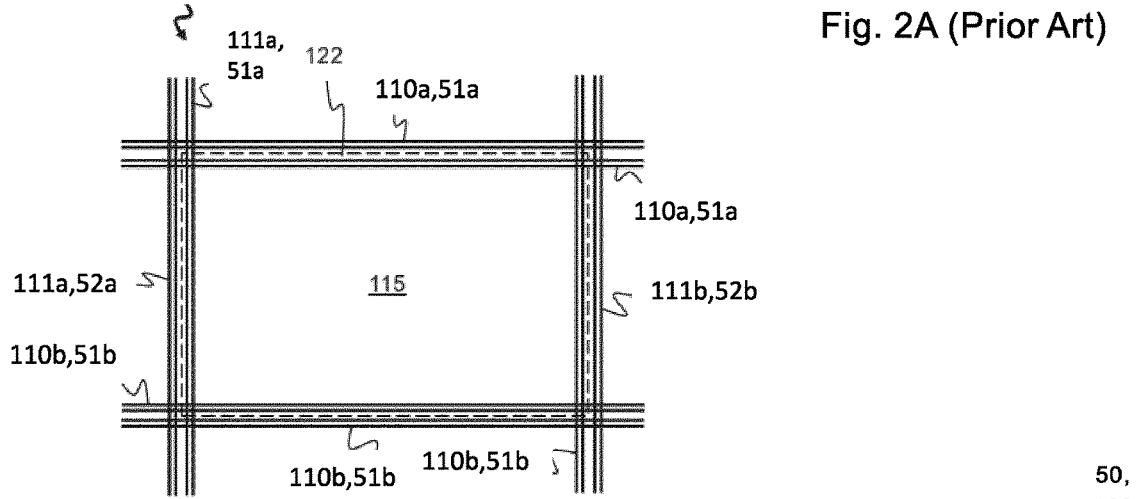
Figure 2C:
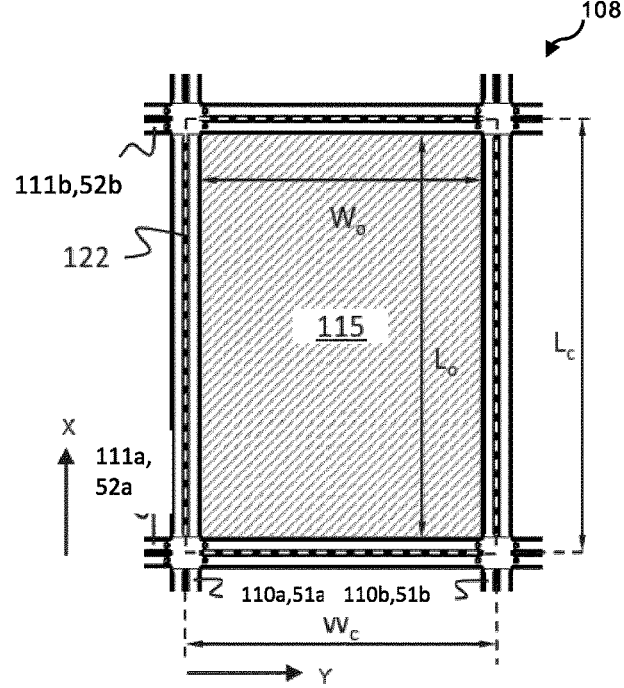

The rail system 108 may be a single rail system, as is shown in FIG. 2A. Alternatively, the rail system 108 may be a double rail system, as is shown in FIG. 2B. In a further alternative, the rail system 108 may be a combination of single and double rail system. Details of the single and double rail systems are disclosed in this specification under the section of background and prior art.

Figure 3A:
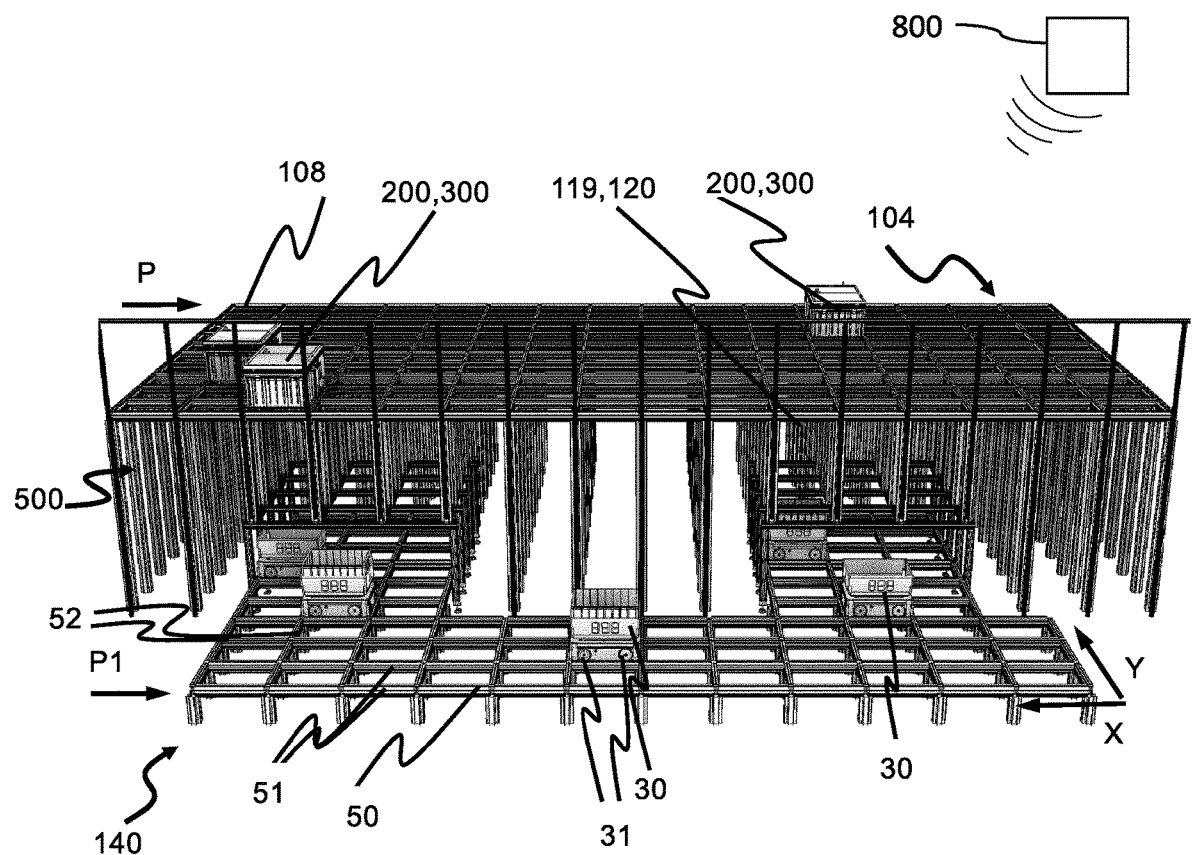
FIG. 3A is a perspective view of an exemplary embodiment of a storage grid and a delivery system comprising a delivery rail system and delivery vehicles.

Perspective views of an automated storage and retrieval system are shown in FIG. 3A. The automated storage and retrieval system comprises a storage grid 104, onto which a plurality of container handling vehicles 200,300 operates, and a delivery system 140 comprising a delivery rail system 50 onto which a plurality of delivery vehicles 30 operates. The delivery vehicles 30 are provided with wheel arrangement 31 comprising first and second sets of wheels for driving the delivery vehicles in the first direction (X) and the second direction (Y). A master control system 800 keeps track of the container handling vehicles 200,300 operating on the storage grid 104 and the delivery vehicles 30 operating on the delivery rail system 30.

Further, the delivery system 140 comprises one or more of the delivery vehicles 30 as described above, i.e. delivery vehicles 30 configured to receive and support one or more storage containers 106 for transport between one or more delivery columns 119,120 of the storage grid 104 and one or more predetermined positions outside the storage grid 104. The predetermined positions may for example be a second location, a container accessing station, a conveyor line, another storage container, or a transport vehicle such as a truck.

The delivery system 140 may further comprise a delivery rail system 50 situated below a delivery port of the one or more delivery columns 119,120.

As shown in FIG. 3, the delivery rail system 50 may be constructed in the same way or a similar way as the rail system 108 for the container handling vehicles 200,300.

Hence, the delivery rail system 50 may comprise a first set of parallel rails 51 arranged in a horizontal plane (P1) and extending in a first direction (X), and a second set of parallel rails 52 arranged in the horizontal plane (P1) and extending in a second direction (Y) which is orthogonal to the first direction (X).

Figure 3B:
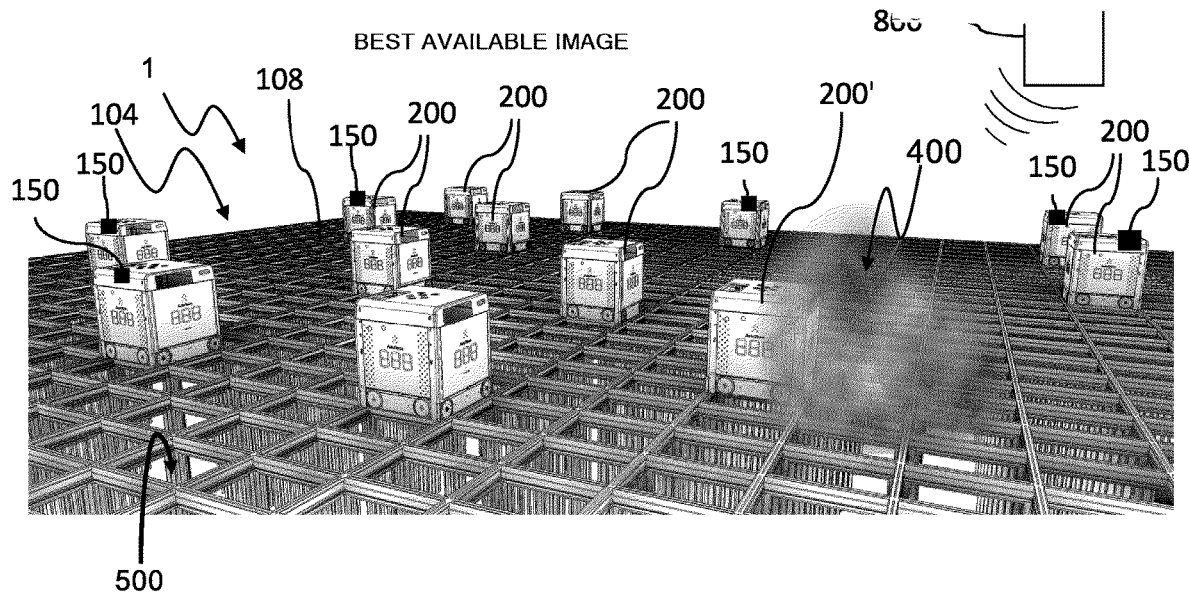
FIGS. 3B and 3C show two examples where fume, smoke or heat emission has occurred in an automated storage and retrieval system.
Figure 3C:
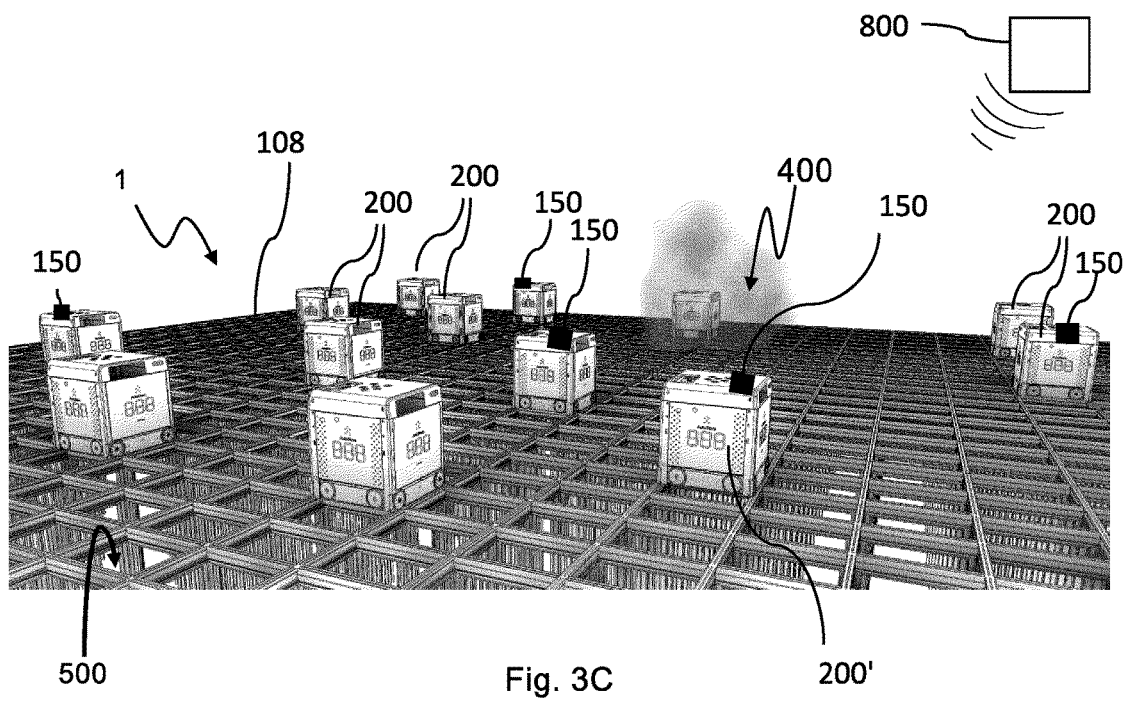

FIGS. 3B and 3C show two examples where fume, smoke or heat emission 400 has occurred on a storage grid 104 in an automated storage and retrieval system 1. A plurality of container handling vehicles 200, 200' operates on a rail system 108 of a storage grid 104 in an automated storage and retrieval system 1 and communicates with a master control system 800. Some of the container handling vehicles 200, 200' have been equipped with fire detection device 150. However, preferably a majority, preferably above 50%, of the container handling vehicles 200, 200' comprises a fire detection device 150, possibly together with stationary fire detection devices 150 arranged on the storage grid 104.

Figure 4:
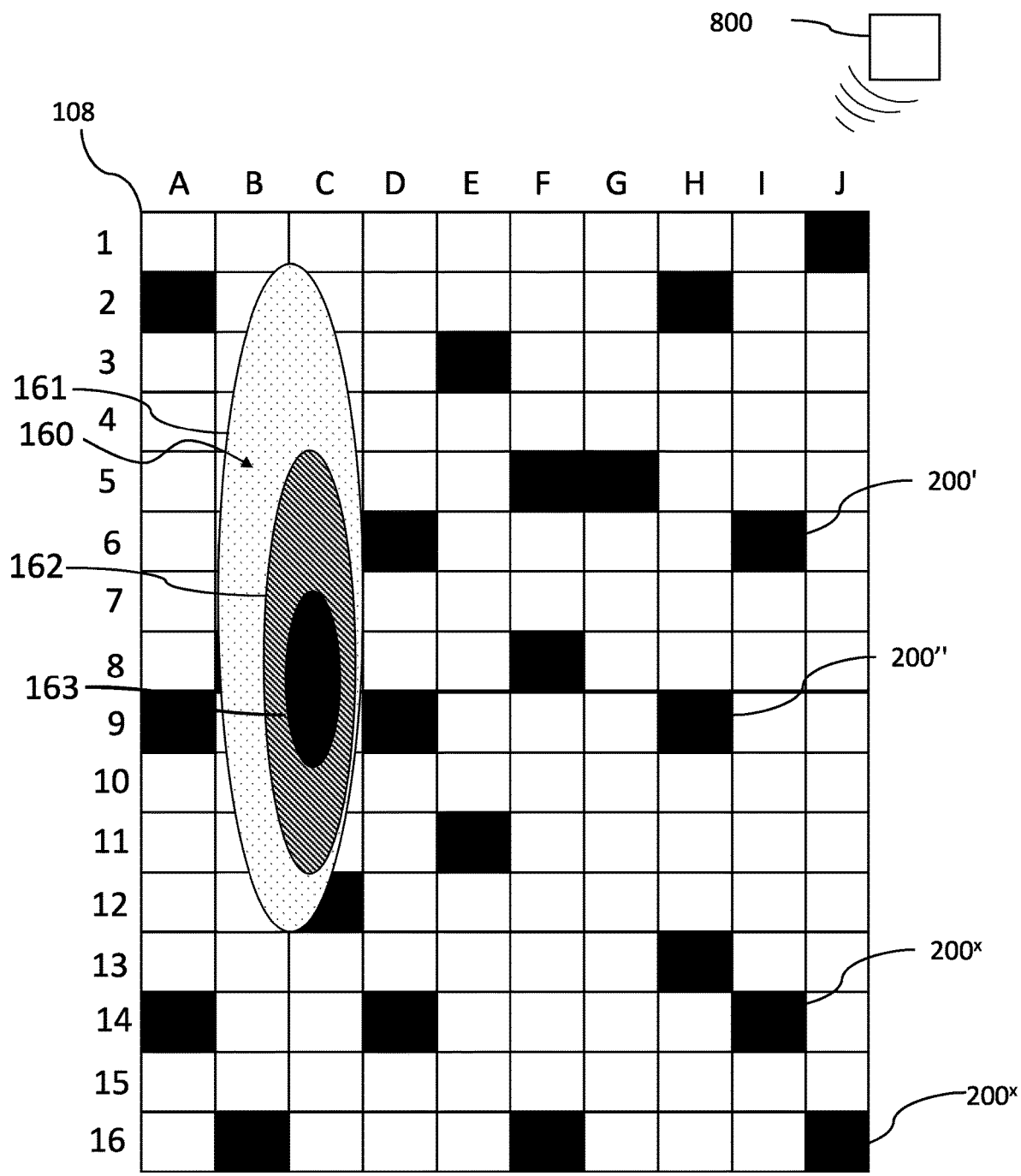
FIG. 4 shows an example of a heat map created by the master control system based on input from a plurality of fire detection devices arranged on container handling vehicles.

FIG. 4 shows an example of a heat map created by the master control system based on input from a plurality of fire detection devices 150 arranged on container handling vehicles 200,300.

In the following, an example of utilizing fire detection devices 150 on container handling vehicles 200', 200$^x$ such as to create a heat map 160 will be described in greater detail. Order for the master control system 800 to provide the heat map 160, preferably three or more fire detection devices 150 which can provide additional input to the master control system 800 with regards to concentration of fume or smoke, or in case of heat detection, additional input from e.g. an infra-red camera or temperature sensor on the container handling vehicle 200',200$^x$, are utilized. Then, based on the location of the container handling vehicle 200',200$^x$ on the rail system 108 and the concentration of fume or smoke measured by the heat detection device 150, the master control system 800 can create a heat map 160 which indicates the probable location of the source of the fume, smoke or heat emission (see FIGS. 3B and 3C). The disclosed heat map 160 comprises an outer portion 161 indicated by coarse-grains, an intermediate portion 161 indicated by stripes and an inner portion 162 indicated by solid black. The heat map 160 may indicated that it is certain that the source of the fume, smoke or heat emission 400 is within the outer portion 161, and almost certain that the source of the fume, smoke or heat emission 400 is within the striped portion 161, and very likely that the source of the fume, smoke or heat emission 400 is within the inner portion 162. If the master control system 800 has drawn up such a heat map 160, it is most promising for any fire-fighting crew to focus their initial fire-fighting in the inner portion 162 (i.e. within cell locations B7-B10 and C7-C10) on FIG. 4.

Figure 5A:
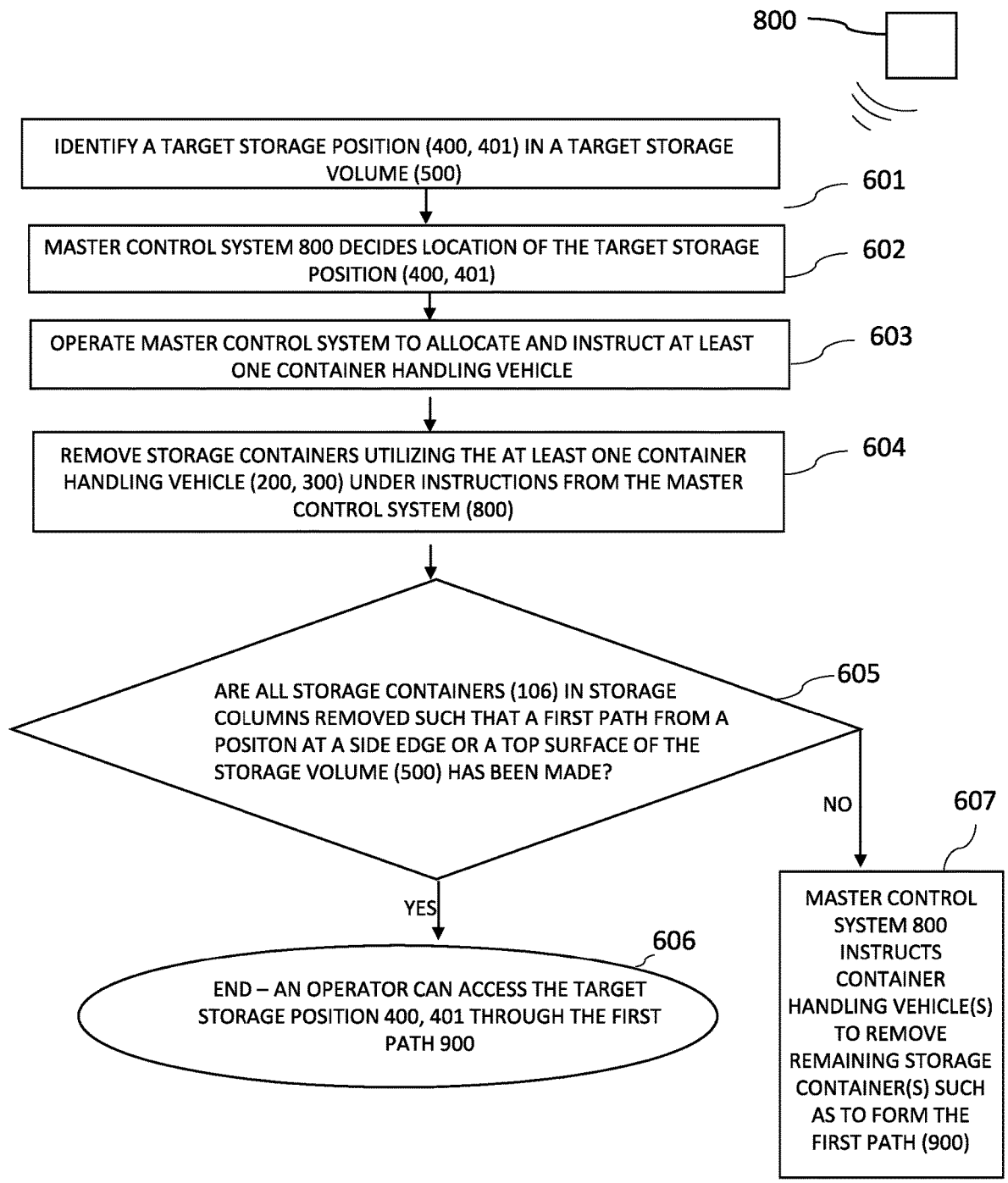
FIG. 5A is a flow-chart of how an operator can be provided access to a target storage position in an automated storage and retrieval system.

FIG. 5A is a flow-chart of how an operator can be provided access to a target storage position 400, 401 in an automated storage and retrieval system 1. Such an operation may include the steps of:

Step 601: IDENTIFY A TARGET STORAGE POSITION (400, 401) IN A TARGET STORAGE VOLUME (500)

Step 602: MASTER CONTROL SYSTEM 800 DECIDES LOCATION OF THE TARGET STORAGE POSITION (400, 401)

Step 603: OPERATE MASTER CONTROL SYSTEM TO ALLOCATE AND INSTRUCT AT LEAST ONE CONTAINER HANDLING VEHICLE Step 604: REMOVE STORAGE CONTAINERS UTILIZING THE AT LEAST ONE CONTAINER HANDLING VEHICLE (200, 300) UNDER INSTRUCTIONS FROM THE MASTER CONTROL SYSTEM (800)

Step 605: ARE ALL STORAGE CONTAINERS (106) IN STORAGE COLUMNS REMOVED SUCH THAT A FIRST PATH FROM A POSITON AT A SIDE EDGE OR A TOP SURFACE OF THE STORAGE VOLUME (500) HAS BEEN MADE?

IF "YES" IN STEP 605 proceed to Step 606: END—AN OPERATOR CAN ACCESS THE TARGET STORAGE POSITION 400, 401 THROUGH THE FIRST PATH 900

IF "NO" IN STEP 605 proceed to Step 607: MASTER CONTROL SYSTEM 800 INSTRUCTS CONTAINER HANDLING VEHICLE(S) TO REMOVE REMAINING STORAGE CONTAINER(S) SUCH AS TO FORM THE FIRST PATH (900)

Figure 5B:
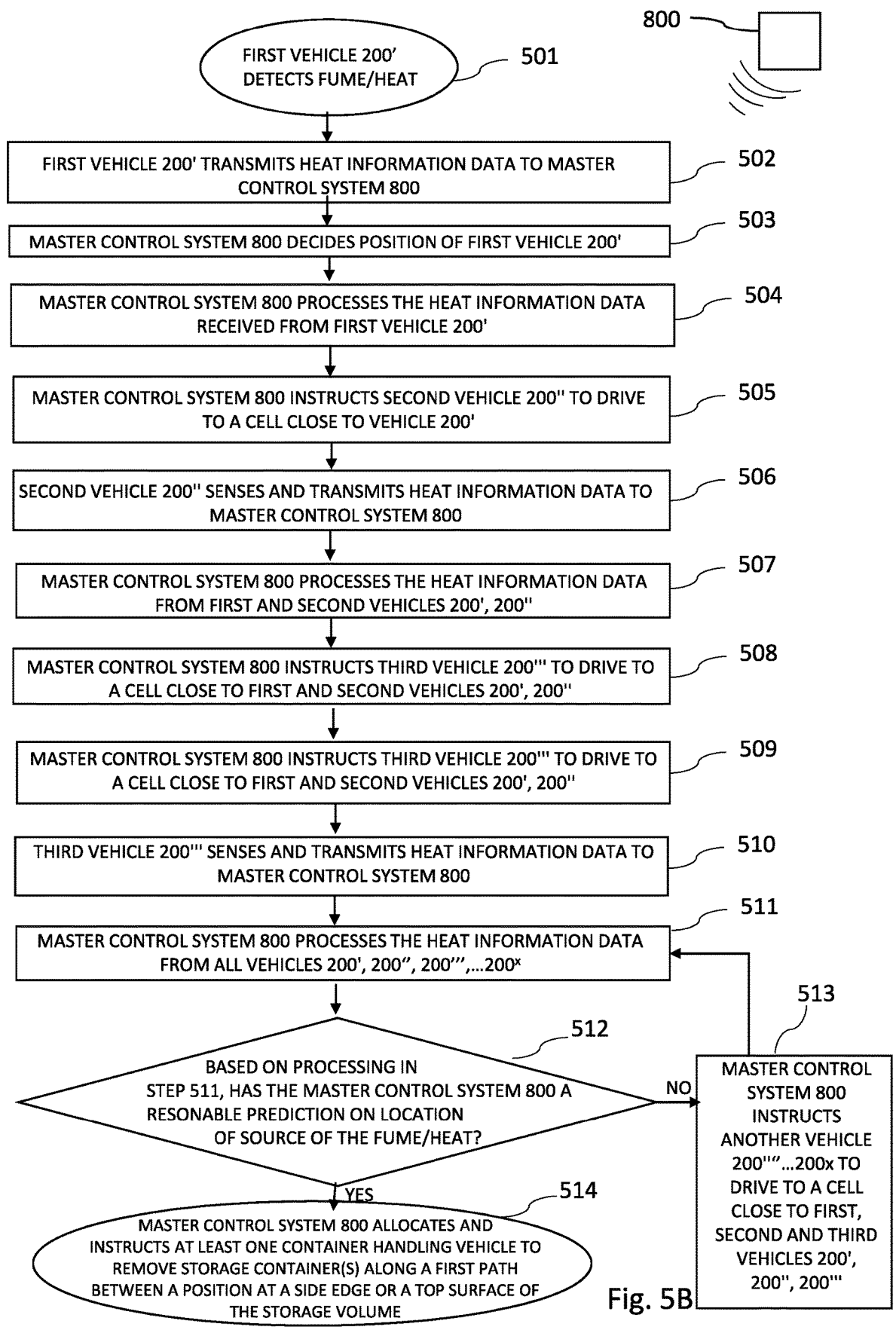
FIG. 5B is a flow-chart of an example of steps to be taken in the event a container handling vehicle detects fume, smoke or heat.

FIG. 5B is a flow-chart of an example of steps to be taken in the event a container handling vehicle detects fume, smoke or heat. Such a process may include the following steps:

Step 501: VEHICLE DETECTS FUME/HEAT

Step 502: FIRST VEHICLE 200' TRANSMITS DATA FROM THE FIRE DETECTION DEVICE TO MASTER CONTROL SYSTEM 800

Step 503: MASTER CONTROL SYSTEM 800 DECIDES POSITION OF FIRST VEHICLE 200'

Step 504: MASTER CONTROL SYSTEM 800 PROCESSES THE DATA FROM THE FIRE DETECTION DEVICE RECEIVED FROM FIRST VEHICLE 200'

Step 505: MASTER CONTROL SYSTEM 800 INSTRUCTS SECOND VEHICLE Step 200" TO DRIVE TO A CELL CLOSE TO VEHICLE 200'

Step 506: SECOND VEHICLE 200" SENSES AND TRANSMITS DATA FROM THE FIRE DETECTION DEVICE TO MASTER CONTROL SYSTEM 800

Step 507: MASTER CONTROL SYSTEM 800 PROCESSES THE DATA FROM THE FIRE DETECTION DEVICE FROM FIRST AND SECOND VEHICLES 200', 200"

Step 508: MASTER CONTROL SYSTEM 800 INSTRUCTS THIRD VEHICLE 200''' TO DRIVE TO A CELL CLOSE TO FIRST AND SECOND VEHICLES 200', 200"

Step 509: MASTER CONTROL SYSTEM 800 INSTRUCTS THIRD VEHICLE 200''' TO DRIVE TO A CELL CLOSE TO FIRST AND SECOND VEHICLES 200', 200"

Step 510: THIRD VEHICLE 200''' SENSES AND TRANSMITS DATA FROM THE FIRE DETECTION DEVICE TO MASTER CONTROL SYSTEM 800

Step 511: MASTER CONTROL SYSTEM 800 PROCESSES THE DATA FROM THE FIRE DETECTION DEVICE FROM ALL VEHICLES 200', 200", 200''', ... 200$^x$

Step 512: BASED ON PROCESSING IN STEP 511, HAS THE MASTER CONTROL SYSTEM 800 A REASONABLE PREDICTION ON LOCATION OF SOURCE OF THE FUME/HEAT?

IF "YES" IN STEP 512 proceed to step 514: ALLOCATE AND INSTRUCT AT LEAST ONE CONTAINER HAN- DLING VEHICLE TO REMOVE STORAGE CONTAINERS ALONG A FIRST PATH BETWEEN A POSITION AT A SIDE EDGE OR A TOP SURFACE OF THE STORAGE VOLUME IF "NO" IN STEP 512: proceed to step 513: MASTER CONTROL SYSTEM 800 INSTRUCTS ANOTHER VEHICLE 200"" . . . 200x TO DRIVE TO A CELL CLOSE TO FIRST, SECOND AND THIRD VEHICLES 200', 200", 200'"

FIGS. 6A-6D are sequential step-by-step illustrations of the flow-chart of FIG. 5B, where one and one container handling vehicle 200' ˙ ˙ ˙ ˣ with a fire detection device is instructed to drive to grid cells close to a container handling vehicle 200' that has detected fume, smoke or heat 400 in order for the master control system 800 to process data from the fire detection device received from the container handling vehicles 200' ˙ ˙ ˙ ˣ to predict location of the source of the fume, smoke or heat 400.

Figure 6A:
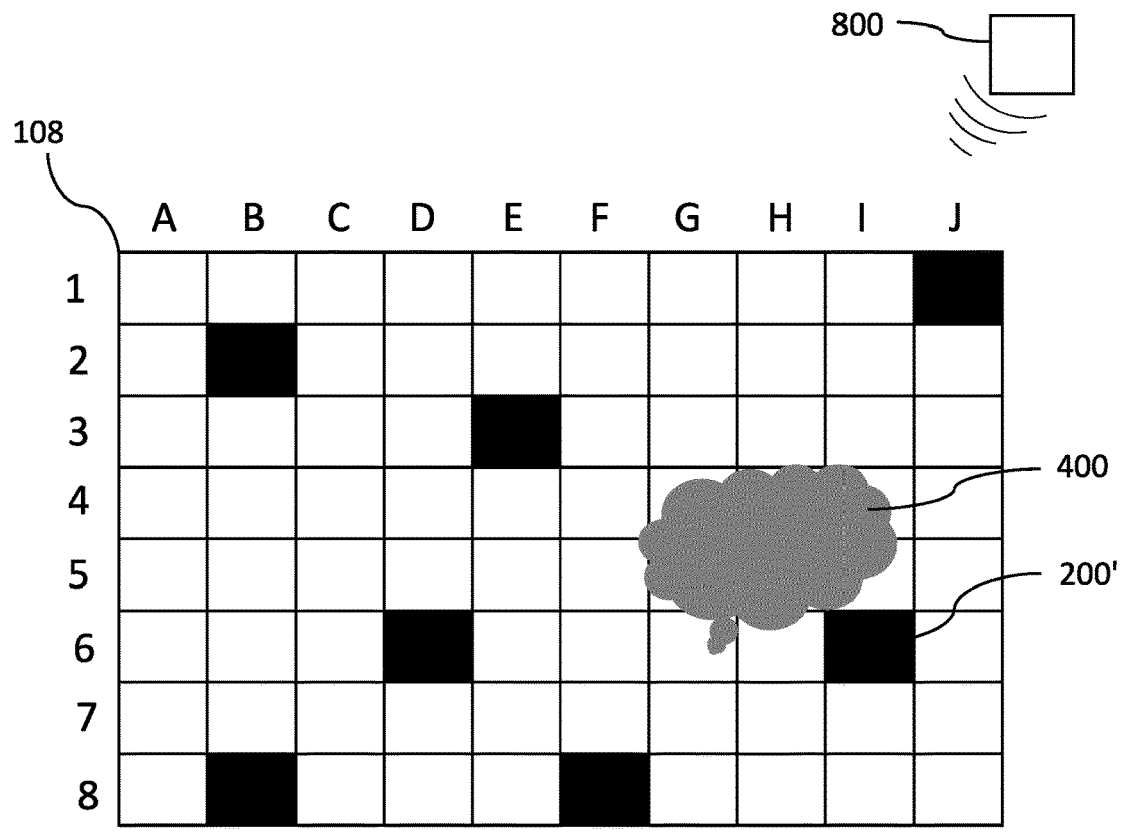
FIGS. 6A-6D are sequential step-by-step illustrations of the flow-chart of FIG. 5B, where one and one container handling vehicle with a fire detection device is instructed to drive to grid cells close to a detected fume, smoke or heat in order for the master control system to process data from the fire detection device received from the container handling vehicles to predict a location of the source of the fume, smoke or heat.

In FIG. 6A a first container handling vehicle 200' in cell H5, which first container handling vehicle 200' is provided with a fire detection device (not shown in FIG. 6A), detects fume, smoke or heat 400. The first container handling vehicle 200' transmits data from the fire detection device to master control system 800. The master control system 800 keeps continuous track of all of the container handling vehicles 200' ˙ ˙ ˙ ˣ, and thus know the position of the first container handling vehicle 201' which has detected fume, smoke or heat 400. The master control system 800 processes the data from the fire detection device received data from the fire detection device received from the first container handling vehicle 200'.

Figure 6B:
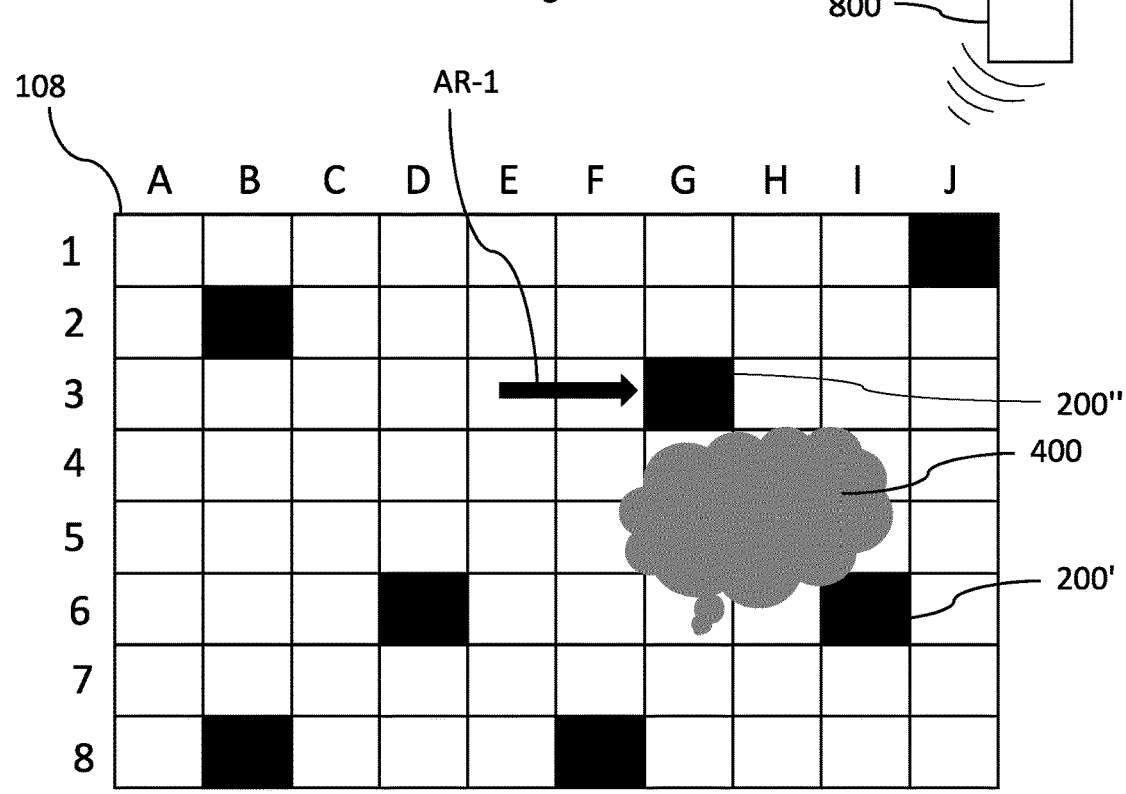

In FIG. 6B the master control system 800, based on the input from the first container handling vehicle 200', has instructed a second container handling vehicle 200" initially positioned in cell E3, to move to cell G3 (as illustrated by arrow AR-1) which is closer to the first container handling vehicle 200' (and expected to be closer to the source of the fume, smoke or heat emission 400). When the second container handling vehicle 200" enters or has entered cell G3, the fire detection device of the second container handling vehicle 200" transmits data from the fire detection device to the master control system 800. The master control system 800 processes data from the fire detection device from the first and second container handling vehicles 200', 200".

Figure 6C:
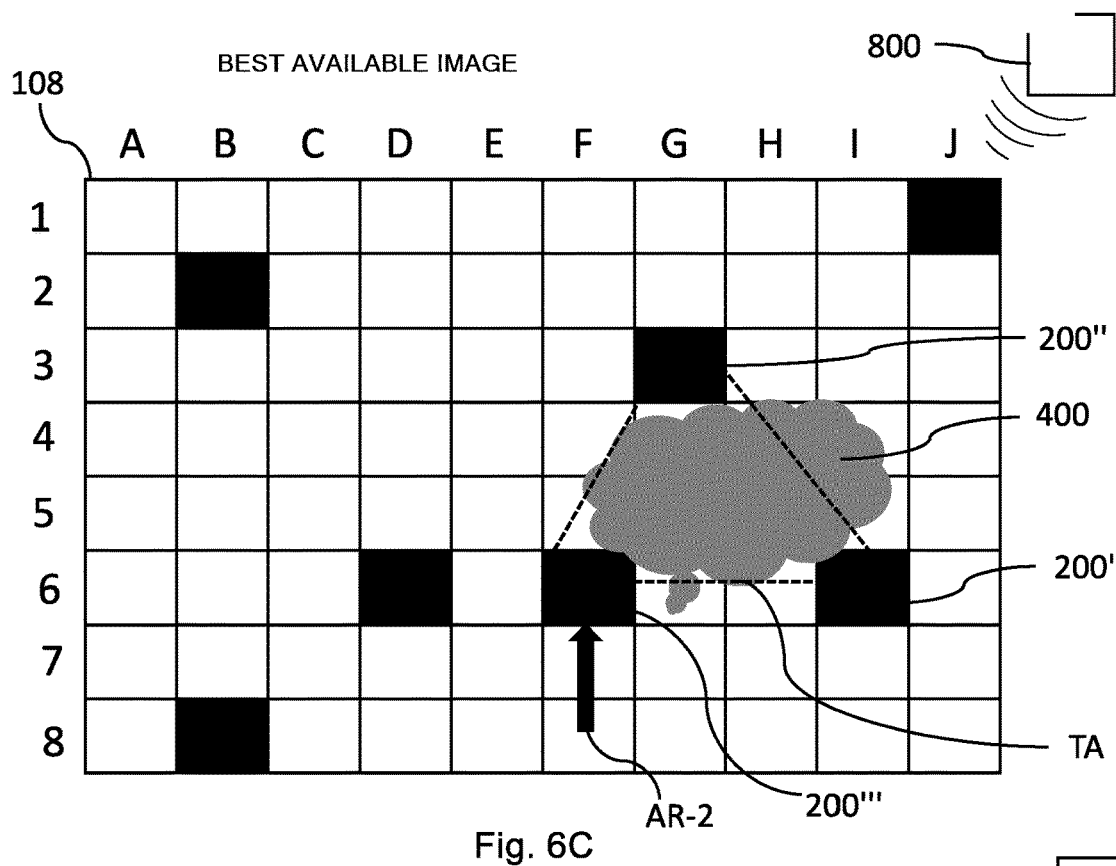

In FIG. 6C the master control system 800, based on the input from the first and second container handling vehicles 200', 200", has instructed a third container handling vehicle 200'" initially positioned in cell F8, to move to cell F6 (as illustrated by arrow AR-2) which is closer to the first and second container handling vehicles 200', 200" (and expected to be closer to the source of the fume, smoke or heat emission 400). When the third container handling vehicle 200'" enters or has entered cell F6, the fire detection device of the third container handling vehicle 200'" transmits data from the fire detection device to the master control system 800. The master control system 800 processes data from the fire detection device from the first, second and third container handling vehicles 200', 200", 200'". If the master control system 800, based on the processing has a reasonable prediction on the location of the source of the fume, smoke or heat 400, no further container handling vehicles 200ˣ are instructed to move closer to the expected source of the fume, smoke or heat emission 400. Normally, arranging three container handling vehicles 200', 200", 200'" in a triangular arrangement TA enclosing the source of the fume, smoke or heat emission 400, will be sufficient in order to establish a reasonable prediction on location of the source for the fume, smoke or heat emission 400 is. However, if a reasonable prediction on the location of the source of the fume, smoke or heat 400 cannot be established, yet another container handling vehicle 200 is instructed to move to a cell closer to the expected source of the fume, smoke or heat emission 400, which situation is indicated in FIG. 6D.

Figure 6D:
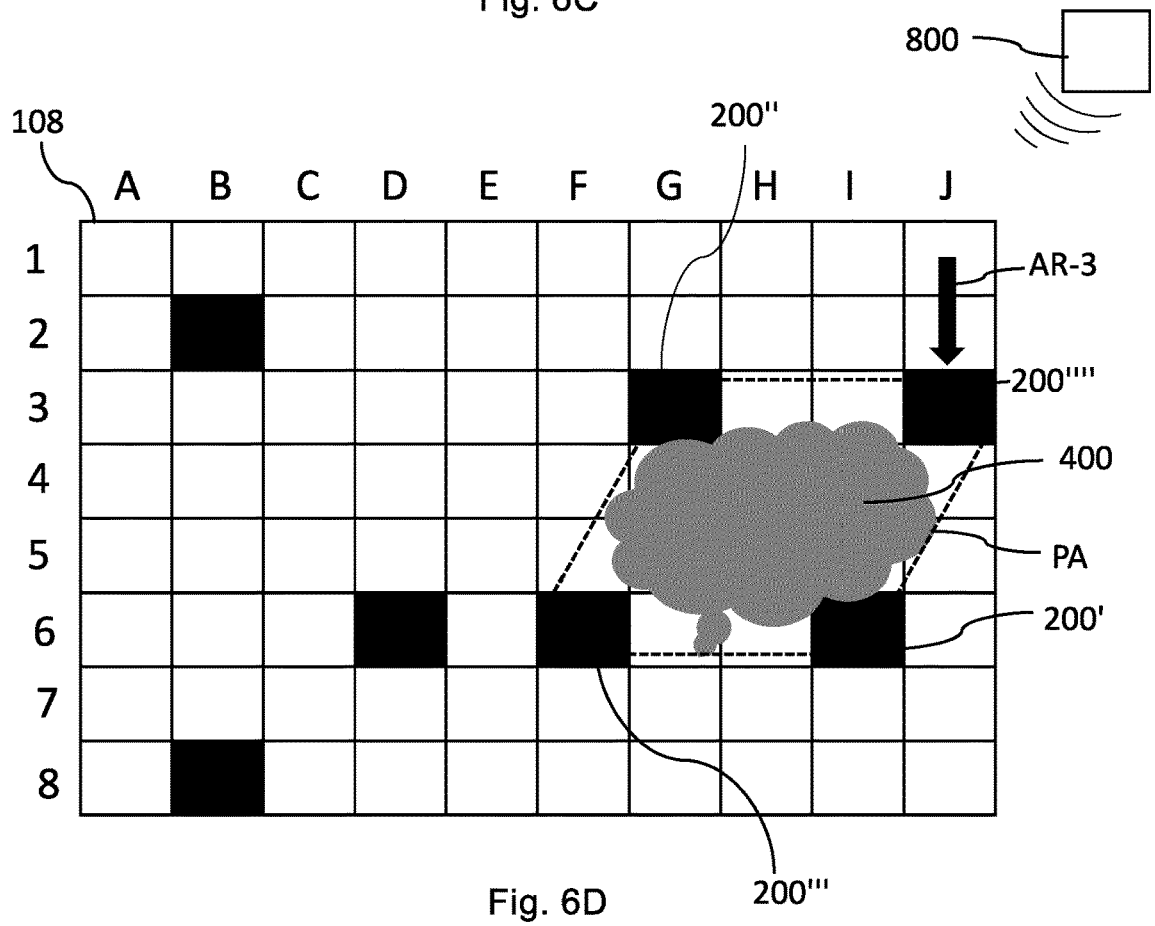

In FIG. 6D the master control system 800, based on the input from the first, second and third container handling vehicles 200', 200", 200'", has instructed a fourth container handling vehicle 200"" initially positioned in cell J1, to move to cell J3 (as illustrated by arrow AR-3) which is closer to the first, second and or third container handling vehicles 200', 200", 200'" (and expected to be closer to the source of the fume, smoke or heat emission 400). When the fourth container handling vehicle 200"" enters or has entered cell J3, the fire detection device of the fourth container handling vehicle 200"" transmits data from the fire detection device to the master control system 800. The master control system 800 processes data from the fire detection devices from the first, second, third container handling vehicles 200', 200", 200'", 200"". A total of four container handling vehicles 200', 200", 200'", 200"" are arranged as a four-cornered polygon PA enclosing the source of the fume, smoke or heat emission 400. This setup is almost certainly enough to establish a reasonable location for the source of the fume, smoke or heat emission 400. However, in the unlikely event that four container handling vehicles 200', 200", 200'", 200"" are not sufficient, the master control system 800 may instruct further container handling vehicles 200' with fire detection device to move closer to the expected location of the source of the fume, smoke or heat emission 400.

Figure 7A:
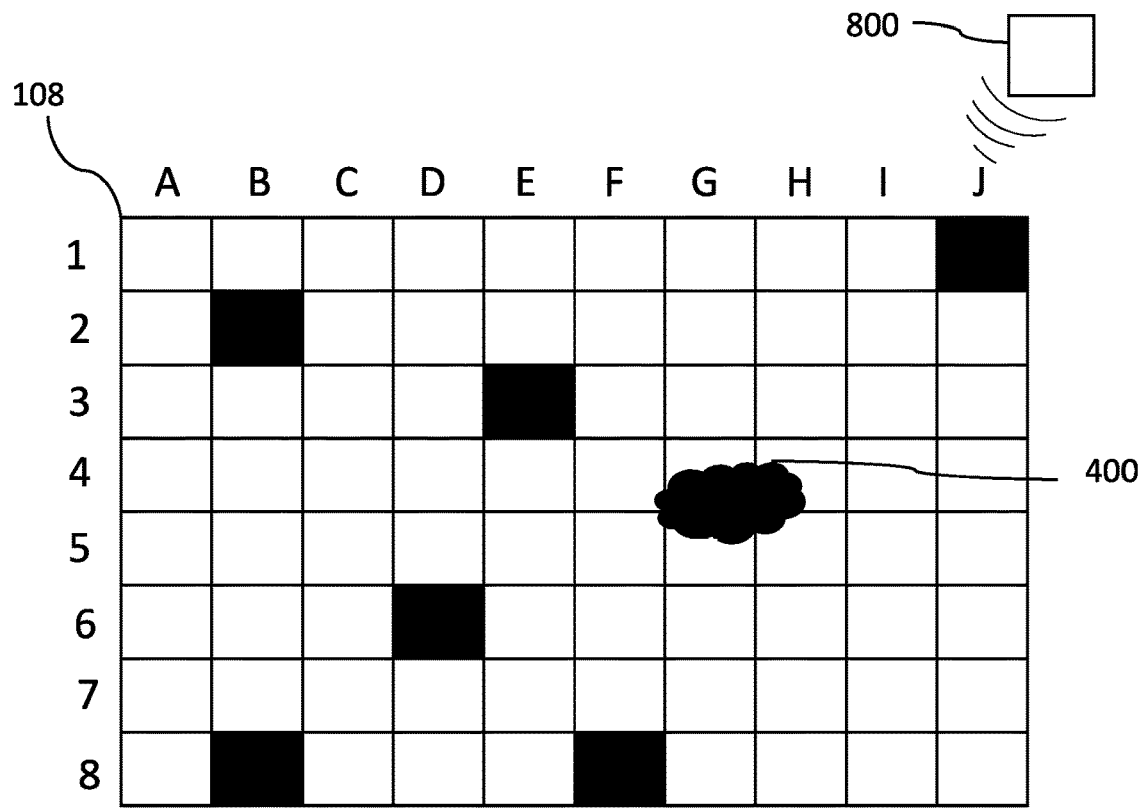
FIG. 7A shows a scene of fire after it has been extinguished by, for example, a sprinkler.

FIG. 7A shows a scene of fire 400 after it has been extinguished by e.g. a sprinkler. The expected scene of fire 400 is in the storage columns represented by cells G4, G5, H4, H5 in FIG. 7A.

Figure 7B:
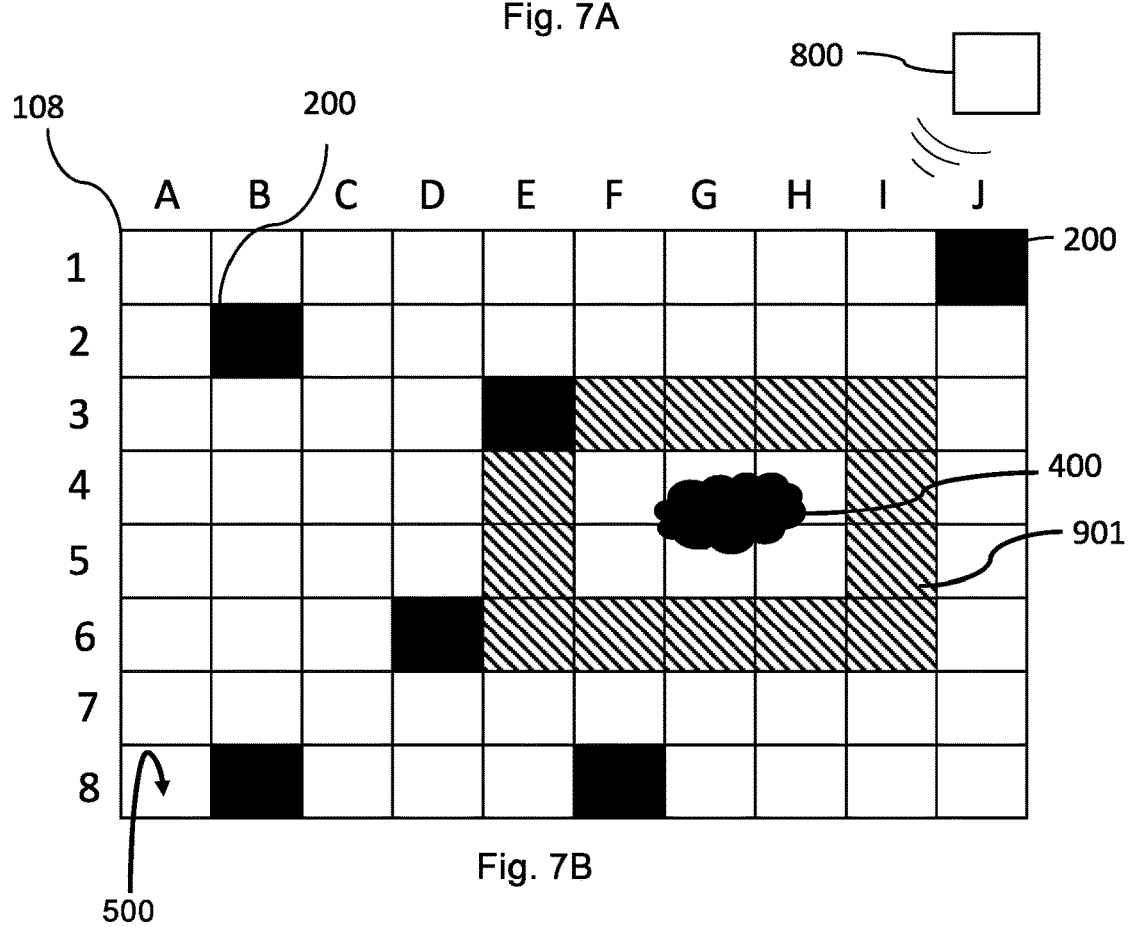
FIG. 7B shows an example where a container handing vehicle(s) has removed storage containers and created a loop path around a scene of a fire.

Referring to FIG. 7B it is disclosed an example where a container handing vehicle(s) 200 has removed storage containers and created a loop path 901 around the scene of fire, extending 360 degrees around the scene of fire 400. The loop path 901 is in the storage columns represented by cells E3-E6, E6-I6, I6-I3 and I3-E3 forming a rectangular pattern (i.e. a loop) around the scene of fire 400.

Figure 7C:
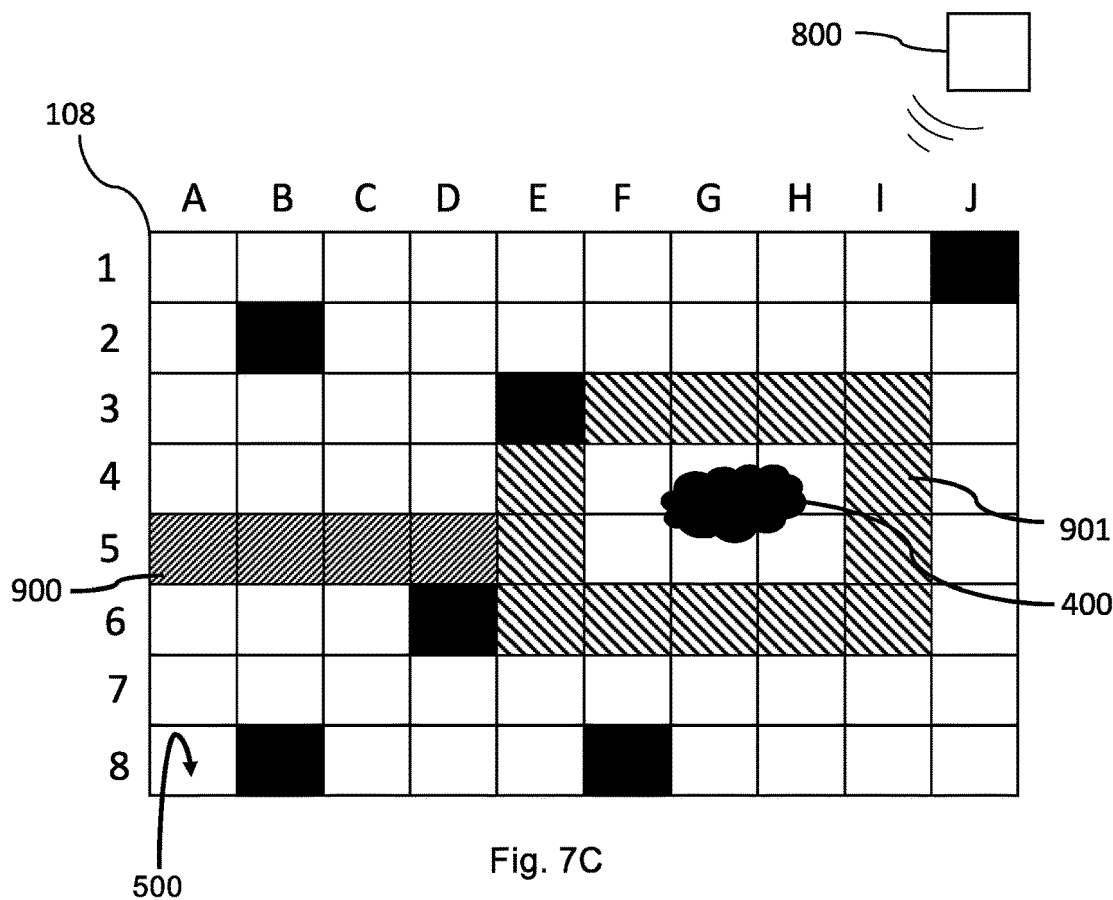
FIG. 7C shows an example where a container handling vehicle(s) has removed storage containers in order to create a first path extending from a position at a side edge of the storage volume to the loop path around the scene of fire in FIG. 7B.

Referring to FIG. 7C it is disclosed an example where container handing vehicle(s) 200 has removed storage containers in order to create a first path 900 extending from a position at a side edge of the storage volume 500 to the loop path around the scene of fire in FIG. 7B. In FIG. 7C, the first path 900 is created from the side edge on the left hand side of the Figure and the storage containers in cells A5-D5 have been removed in order to create the first path 900.

Figure 7D:
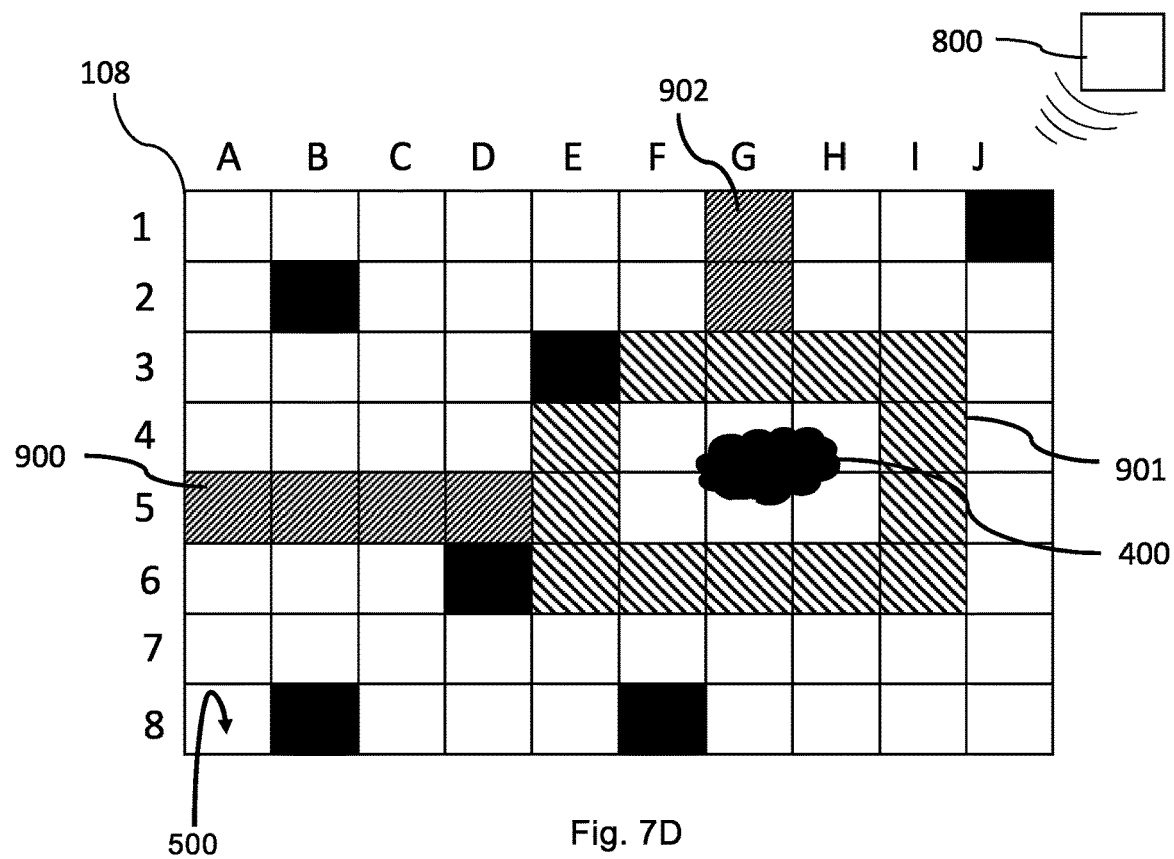
FIG. 7D shows an example where a container handing vehicle(s) has removed storage containers in order to create a second path extending from a position at a side edge of the storage volume and to the loop path around the scene of fire in FIGS. 7B and 7C.

Referring to FIG. 7D it is disclosed an example where container handing vehicle(s) has removed storage containers in order to create a second path 902 extending from a position at a side edge of the storage volume 150 and to the loop path 901 around the scene of fire 400 in FIGS. 7B and 7C. In FIG. 7D, the second path 902 is created from the side edge on the top of the Figure and the storage containers in cells G1-G2 have been removed in order to create the second path 902.

Figure 8:
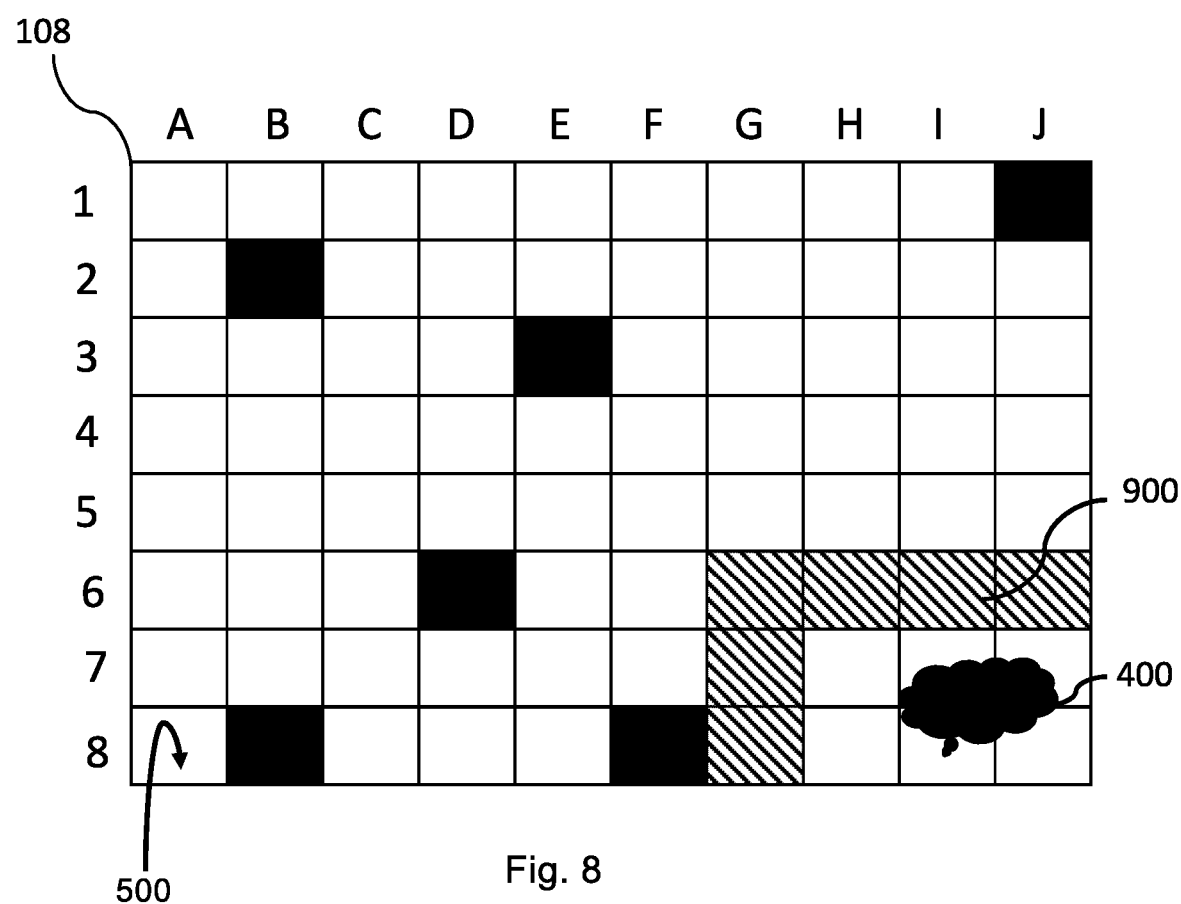
FIG. 8 shows an example where scene of fire, i.e. the target storage position, is close to a corner of the storage volume and where container handling vehicle(s) has created a L-shaped path in the storage volume, the L-shaped path extending between a first side edge of the storage volume to a second side edge of the storage volume.

FIG. 8 shows an example where scene of fire 400, i.e. the target storage position, is close to a corner of the storage volume 500 (the down right corner in FIG. 8) and where container handling vehicle(s) 200 has created a L-shaped path 900 in the storage volume 500. The L-shaped path 900 extends between a first side edge of the storage volume 150 to a second side edge of the storage volume 500. The path 900 in FIG. 8 extends through the storage columns represented by cell G8-G6 and G6-J6. In the particular example of FIG. 8, 360 degrees visual inspection is achieved from the outside of the storage volume 500, i.e. the two side edges on the right hand side in the Figure and the lower side, respectively.

Figure 9A:
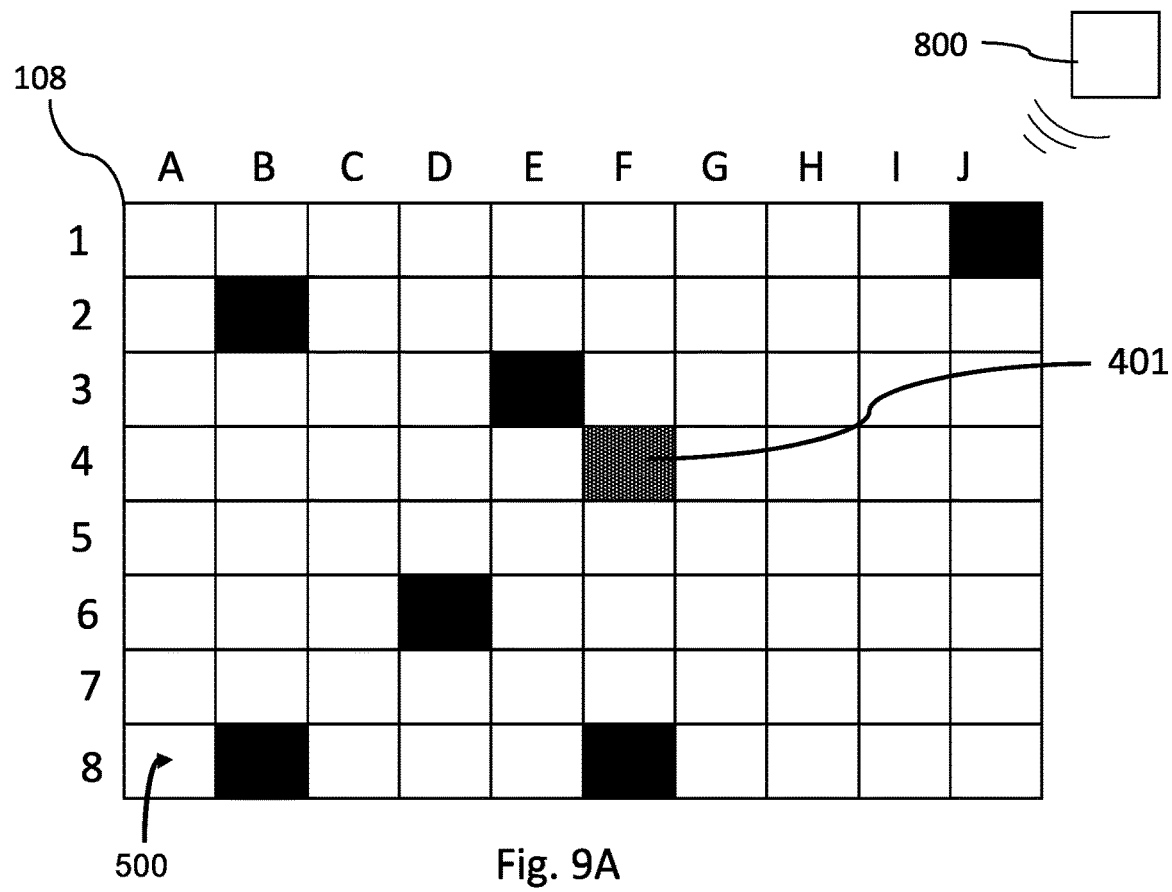
FIG. 9A shows an unliftable storage container in a storage volume.

FIG. 9A shows an example of an unliftable storage container in a storage volume 150. The unliftable storage container is in a target storage position 401 represented by cell numbered F4.

Figure 9B:
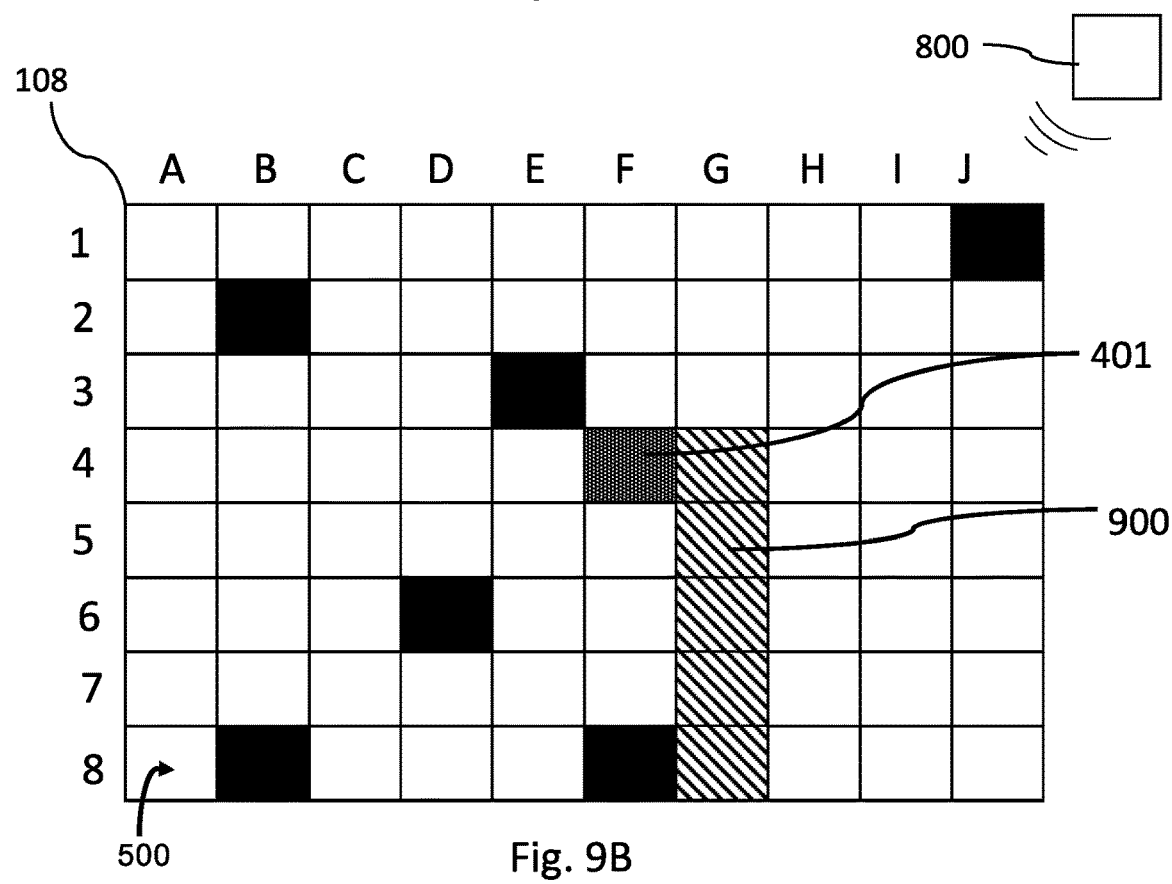
FIG. 9B shows an example where container handling vehicle(s) has removed storage containers in order to create a first path extending from a position at a side edge of the storage volume and the unliftable storage container in FIG. 9A.

FIG. 9B shows an example where container handling vehicle(s) has removed storage containers in order to create a first path 900 from a position at a side edge of the storage volume 150 and to the unliftable storage container in target storage position 401. The first path 900 in FIG. 9B extends from the lower side edge at the storage column represented by cell G8 to storage column represented by cell G4, via positions G7, G6 and G5.

Figure 10A:
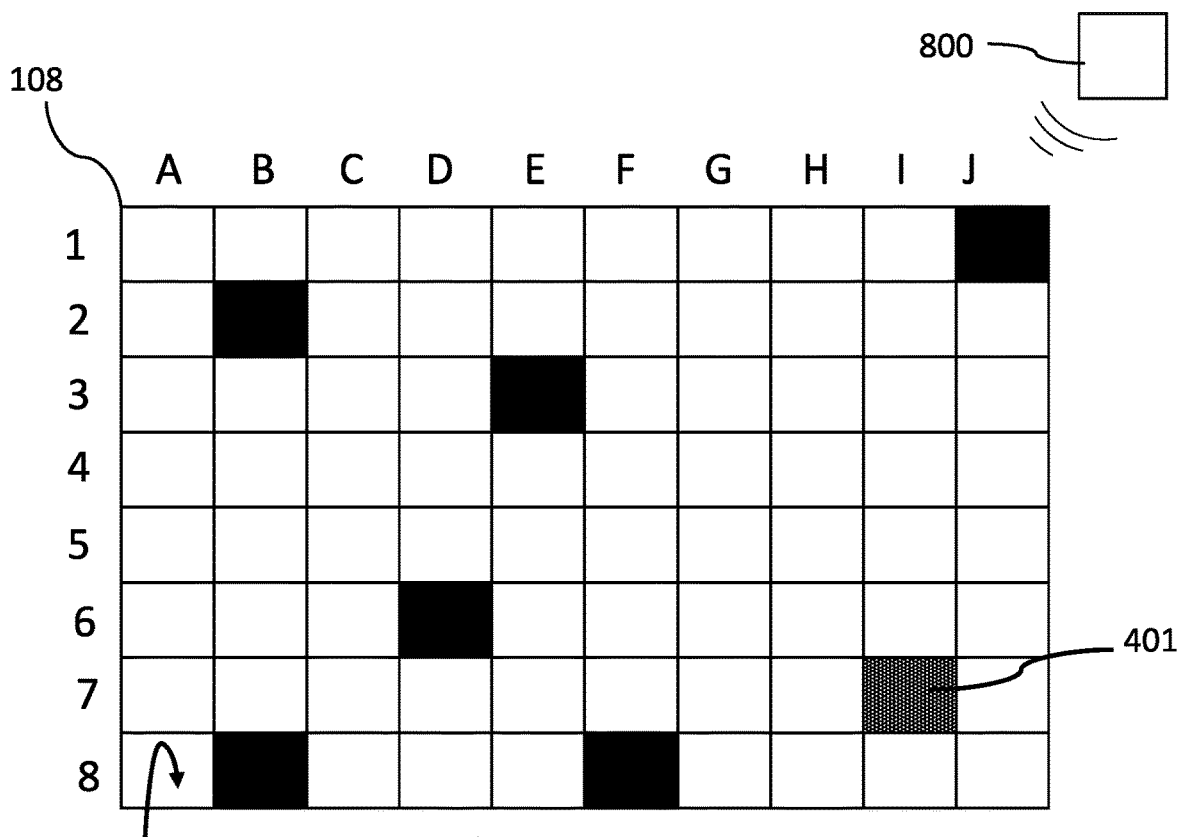
FIG. 10A shows an unliftable storage container in a storage volume at a different position than the unliftable storage container in FIG. 9A.

FIG. 10A shows an unliftable storage container in a storage volume 150 at a different position than the unliftable storage container in FIG. 9A. In FIG. 10A, the unliftable storage container is in a target storage position 401 represented by cell 17.

Figure 10B:
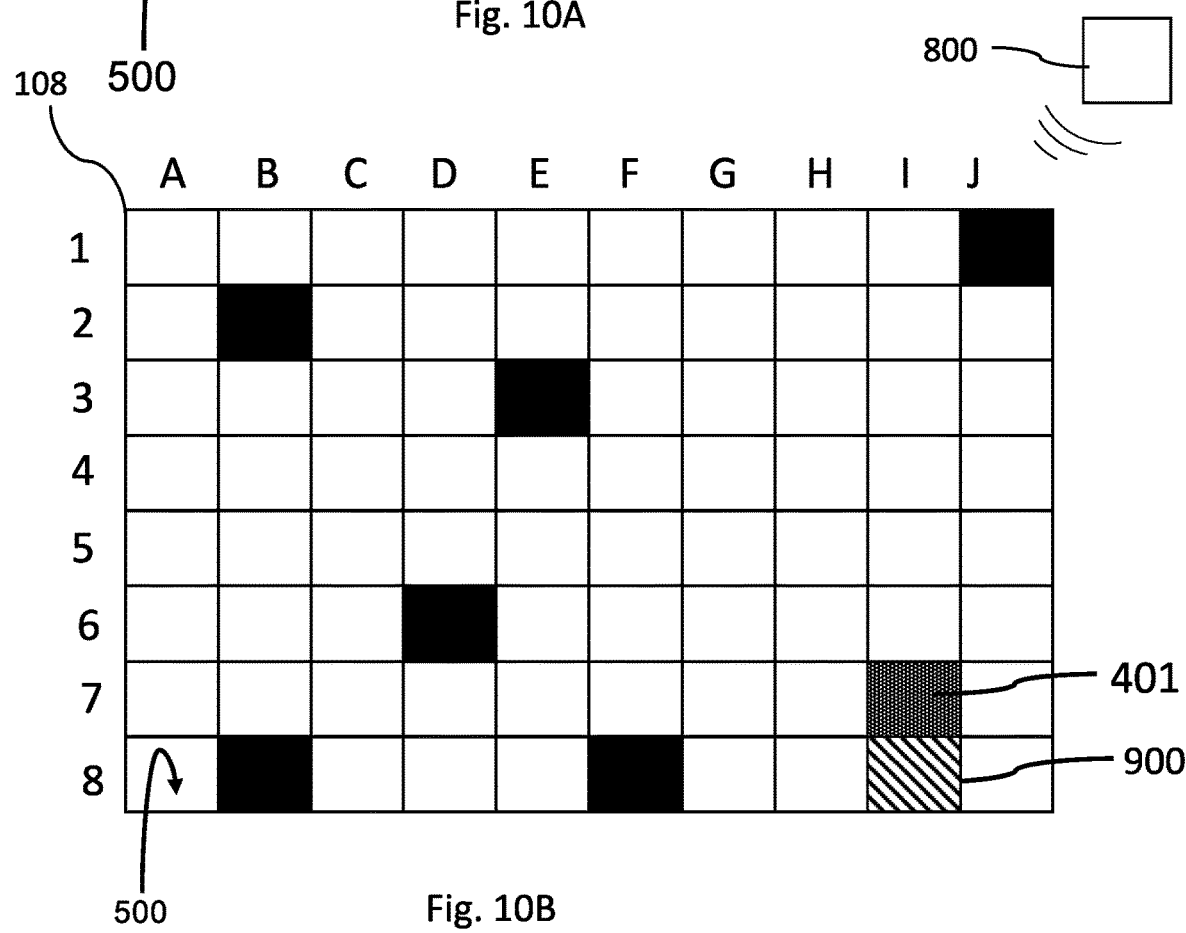
FIG. 10B shows an example where container handling vehicle(s) has removed storage containers in order to create a first path extending from a position at a side edge of the storage volume and the unliftable storage container in FIG. 10A.

Referring to FIG. 10B it is shown an example where container handling vehicle(s) 200 has removed storage containers in order to create a first path 900 that extends from a position at a lower side edge of the storage volume 150 and to the unliftable storage container in FIG. 10A.

Figure 11:
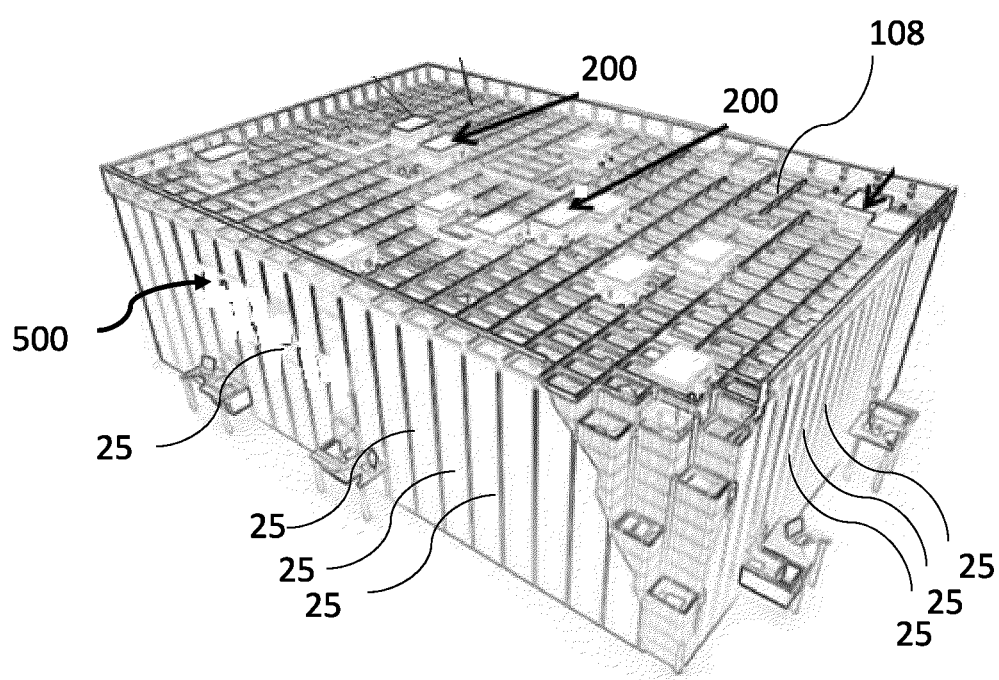
FIG. 11 is a perspective view of an automated storage and retrieval system illustrating that the system may have side panel(s) on the side edges, which side panel(s) are removed in order to be able to access the storage volume below the rail system.

FIG. 11 is a perspective view of an automated storage and retrieval system 1 illustrating that the system may have side panel(s) 25 on the side edges. The side panel(s) 25 can be removed in order to be able to access the storage volume 150 below the rail system 108 at ground level.

In the preceding description, various aspects of an automated storage and retrieval system, vehicle and methods according to the invention have been described with reference to the illustrative embodiment. For example, in most of the figures, container handling vehicles operating on a rail system of a storage grid have been disclosed, but it is obvious that the same system and setup applies to delivery vehicles operating on a delivery rail in a delivery rail system. Thus, the description is not intended to be construed in a limiting sense. Various modifications and variations of the illustrative embodiments, as well as other embodiments of the system, which are apparent to persons skilled in the art, are deemed to lie within the scope of the present invention as defined by the following claims.

LIST OF REFERENCES

1 Automated storage and retrieval system
25 Side panel
30 Delivery vehicle, remotely operated vehicle
31 Wheel arrangement delivery vehicle
50 Delivery rail system
51 First set of parallel rails, delivery rail system
51a,51b Pair of rails of the first rails in delivery rail system
52 Second set of parallel rails, delivery rail system
52a,52b Pair of rails of the second set of rails in delivery rail system
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system/Container handling vehicle rail system
110 First set of parallel rails in first direction X
110a,110b Pair of rails of the first rails
111 Second set of parallel rails in second direction Y
111a,111b Pair of rails of the second set of rails
112 Grid column
115 Grid opening
119 Delivery column
120 Delivery column
122 Grid cell
140 Delivery system
150 Fire detection device
160 Heat map
161 Outer portion, course-grain
162 Intermediate portion, striped black
163 Inner portion, solid black
200,300 Container handling vehicle, remotely operated vehicle
200',200'', . . . , 200$^x$ First, second, . . . , x vehicle, remotely operated vehicle
201 Wheel arrangement
301 Wheel arrangement
400 Scene of fire
401 Unliftable storage container
500 Storage volume
800 Master control system
900 First path
901 Loop path
902 Second path
X First direction
Y Second direction
P Horizontal plane of rail system
P1 Horizontal plane of delivery rail system
$W_c$ Width of grid cell
$L_c$ Length of grid cell
$W_o$ Width of grid opening
$L_o$ Length of grid opening

The invention claimed is:

1. A method of providing an operator access to a target storage position in an automated storage and retrieval system, the automated storage and retrieval system comprising:
a rail system for guiding a plurality of container handling vehicles, the rail system comprising a first set of parallel rails arranged in a horizontal plane and extending in a first direction, and a second set of parallel rails arranged in the horizontal plane and extending in a second direction which is orthogonal to the first direction, wherein the first and second sets of rails form a grid pattern in the horizontal plane comprising a plurality of adjacent grid cells, each grid cell comprising a grid opening defined by a pair of neighboring rails of the first set of rails and a pair of neighboring rails of the second set of rails; the automated storage and retrieval system further comprising a storage volume beneath the rail system, wherein the storage volume comprises storage columns for storing storage containers and the container handling vehicles are operable to retrieve a storage container from a stack of storage containers within the storage volume,
wherein the method comprises:
operating a master control system to allocate and instruct at least one container handling vehicle to remove storage containers along a first path between a position at a side edge or a top surface of the storage volume and the target storage position such that an operator can access the target storage position through the first path when the at least one container handling vehicle has removed the storage containers along the first path.

2. The method according to claim 1, wherein the method further comprises:
determining the target storage position.

3. The method according to claim 1, wherein the first path is a loop path enclosing the target storage position and wherein the master control system instructs the at least one container handling vehicle to remove storage containers along the loop path.

4. The method according to claim 1, wherein the method comprises collecting and evaluating information with regards to location of a scene of fire, fume, heat or smoke in the automated storage and retrieval system, the collecting of information comprises:
operating a plurality of remotely operated vehicles on the rail system, each of the remotely operated vehicles being provided with a detection device for detecting fire, heat, fume or smoke, and wherein the detection devices are configured to transmit data from the detection devices to the master control system via communication means in the remotely operated vehicle carrying the detection device that has collected information; and
utilizing the master control system to process any data from any of the detection devices and using the master control system to provide information of location of the scene of fire, fume, heat, or smoke; and,
utilizing the master control system to determine where to remove storage containers to create the first path.

5. The method according to claim 4, wherein, in case any of the remotely operated vehicles indicates presence of fire, heat, smoke- or fume emission, the method further comprises:
allocating another remotely operated vehicle with a detection device for detecting fire, heat, fume or smoke to move towards the position of the remotely operated vehicles indicating presence of fire, heat, smoke, or fume emission; and
utilizing the master control system to process the data from the detection devices from the remotely operated vehicles, wherein the master control system, based on the processing of the information from the detection devices, decides whether a prediction on location of source of the fire, fume, smoke, or heat emission can be given.

6. The method according to claim 5, wherein, if the master control system has decided that a prediction on location of source of the fire, fume, smoke or heat emission can be given, the method comprises:
utilizing the master control system to determine the position of the source of the fire, fume, smoke, or heat emission in the form of a triangular arrangement by comparing information from at least three detection devices.

7. The method according to claim 6, if the master control system has decided that a prediction on location of source of the fire, fume, smoke, or heat emission cannot be given, the method comprises:
utilizing the master control system to determine the position of the source of the fire, fume, smoke or heat emission in the form of a four-cornered polygon arrangement by comparing information from at least four detection devices.

8. The method according to claim 1, comprising:
operating a master control system to allocate and instruct at least one container handling vehicle to remove storage containers along a second path between a position at a side edge of the storage volume and the target storage position such that an operator can access the target storage position through any of the first and/or second paths.

9. The method according to claim 8, wherein the second path is created from a different side edge of the storage volume than the first path, or the second path is created from the same side edge of the storage volume as the first path.

10. The method according to claim 8, further comprising:
utilizing the master control system to determine where to move the storage containers from the path(s), and, based on where available positions are located, a step of:
instructing the container handling vehicle(s) to move the storage containers to one of the available positions.

11. The method according to claim 10, wherein the available position is an empty storage position or a position at a port.

12. The method according to claim 2, wherein the method provides access to an unliftable storage container within a storage column, and wherein the step of determining the target storage position comprises:
receiving information from a container handling vehicle indicating that a storage container at the target storage position is unliftable;
utilizing the master control system to remove storage containers along the first path between the position at the edge of the storage volume and the target storage position where the unliftable storage container is located such that an operator can access the unliftable storage container.

13. The method according to claim 1, wherein the target storage position is determined based on required access to a target storage position in need of inspection, maintenance, or repair.

14. The method according to claim 1, further comprising:
utilizing the master control system to determine where to move the storage containers from the first path, and, based on where available positions are located, a step of:
instructing the container handling vehicle(s) to move the storage containers to one of the available positions.

15. An automated storage and retrieval system, the automated storage and retrieval system comprising:
a rail system for guiding a plurality of container handling vehicles, the rail system comprising a first set of parallel rails arranged in a horizontal plane and extending in a first direction, and a second set of parallel rails arranged in the horizontal plane and extending in a second direction which is orthogonal to the first direction, which first and second sets of rails form a grid pattern in the horizontal plane comprising a plurality of adjacent grid cells, each grid cell comprising a grid opening defined by a pair of neighboring rails of the first set of rails and a pair of neighboring rails of the second set of rails;
a storage volume beneath the rail system, wherein the storage volume comprises storage columns for storing storage containers and the container handling vehicles are operable to retrieve a storage container from a stack of storage containers within the storage volume;
at least one container handling vehicle operable on the rail system, the container handling vehicle comprising a lifting assembly for picking up storage containers from the storage columns to a position above the lowest level of the wheel arrangement, and the lifting assembly comprises a lifting frame connectable to a storage container, the lifting frame being configured to lift and lower the storage containers from a position in the storage column to a position above the rail system;

a master control system configured to allocate and instruct at least one of the container handling vehicle to remove storage containers along a first path between a position at a side edge or a top surface of the storage volume and a target storage position within the storage volume, such that an operator can access the target storage position through the first path when the at least one container handling vehicle has removed the storage containers along the first path.

* * * * *